United States Patent
Demel et al.

(10) Patent No.: US 11,298,676 B2
(45) Date of Patent: Apr. 12, 2022

(54) POROUS MATERIAL FOR STORING OF MOLECULES AND ITS USE

(71) Applicant: Institute of Inorganic Chemistry, CAS, Husinec (CZ)

(72) Inventors: Jan Demel, Vltavou (CZ); Jan Hynek, Ostrov (CZ)

(73) Assignee: Institute of Inorganic Chemistry, CAS, Husinec (CZ)

( * ) Notice: Subject to any disclaimer, the term of this patent is extended or adjusted under 35 U.S.C. 154(b) by 674 days.

(21) Appl. No.: 16/161,215

(22) Filed: Oct. 16, 2018

(65) Prior Publication Data
US 2019/0210002 A1   Jul. 11, 2019

(30) Foreign Application Priority Data
Oct. 17, 2017   (CZ) ................. CZ2017-663

(51) Int. Cl.
| | |
|---|---|
| *B01J 20/22* | (2006.01) |
| *B01J 20/28* | (2006.01) |
| *C01B 32/50* | (2017.01) |
| *C08G 83/00* | (2006.01) |
| *C01B 21/02* | (2006.01) |
| *C01B 3/00* | (2006.01) |
| *B01J 20/30* | (2006.01) |

(52) U.S. Cl.
CPC ....... *B01J 20/226* (2013.01); *B01J 20/28061* (2013.01); *B01J 20/28064* (2013.01); *B01J 20/28066* (2013.01); *B01J 20/3085* (2013.01); *C01B 3/0015* (2013.01); *C01B 21/02* (2013.01); *C01B 32/50* (2017.08); *C08G 83/003* (2013.01)

(58) Field of Classification Search
CPC .... B01J 20/22; B01J 20/226; B01J 20/28061; B01J 20/28064; B01J 20/28066; B01J 20/3085; C01B 32/50; C01B 3/0015; C01B 21/02; C08G 83/003
USPC ....................................................... 502/401
See application file for complete search history.

(56) References Cited

U.S. PATENT DOCUMENTS

2019/0134602 A1* 5/2019 Yoon ..................... B01J 20/103

* cited by examiner

*Primary Examiner* — Edward M Johnson

(57) ABSTRACT

The invention concerns new types of porous coordination polymers (MOF) and a method for their preparation. MOFs have been prepared through synthesis of salts of trivalent cations $M^{3+}$, the source of which are aluminium, chromium, iron or yttrium salts, it is advantageous if of chlorides, nitrates or sulphates, with linkers carrying two or more phosphinic groups under presence of solvent. Linkers are phenylene-1,4-bis(R phosphinic acid) (PBPA) and biphenylene-4,4'-bis(R phosphinic acid) (BBPA). For the prepared MOFs, the structure has been tested using x-ray powder diffraction, specific surface and porousness which have been characterised through adsorption isotherm of nitrogen and further the stability of prepared MOFs has been determined using thermogravimetric analysis.

All the prepared MOFs have been stable around 400° C. and have contained mesopores or micropores where hydrogen or $CO_2$, for example, can be stored.

11 Claims, 25 Drawing Sheets

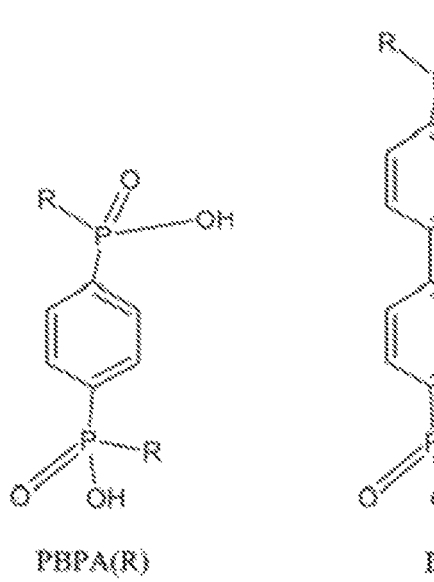
PBPA(R)
Fig. 1A
BBPA(R)
Fig. 1B
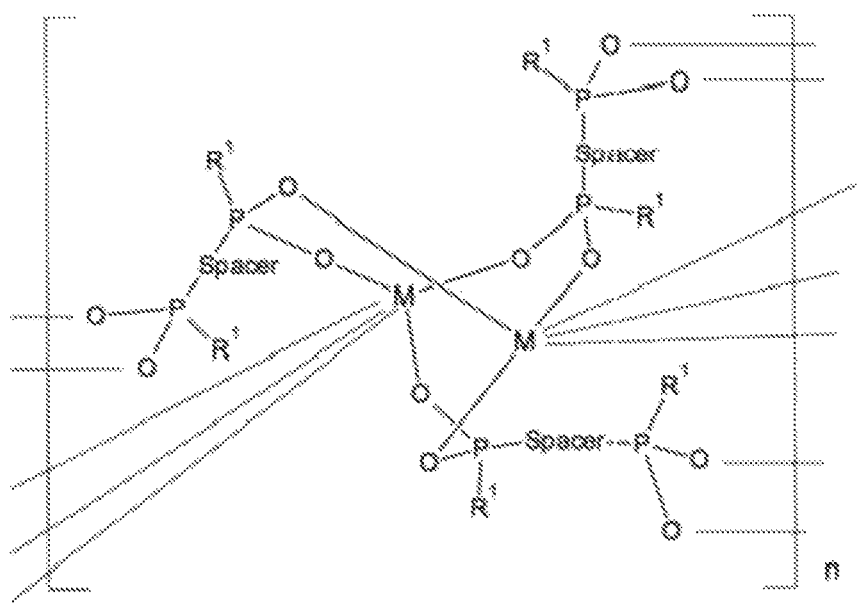
Fig. 2A x = 1-3

X = 1-3
y = 2x + 1

M = trivalent metal

M= trivalent metal

M= trivalent metal

M= trivalent metal

| | Specific surface area (m²/g) | Pore volume (cm³/g) | Pore size (nm) |
|---|---|---|---|
| Fe-MOF s PBPA(Me) | 712 | 0.58 | 1.7 |
| Al-MOF s PBPA(Me) | 921 | 0.89 | 1.6 |
| Y-MOF s PBPA(Me) | 711 | - | >1 |
| Al-MOF s PBPA(Ph) | 224 | - | 0.6 |
| Fe-MOF s BBPA(Me) | 978 | 1.57 | 2.4 |
| Fe-MOF s BBPA(Ph) | 1172 | 2.4 | 2.2 |

POROUS MATERIAL FOR STORING OF MOLECULES AND ITS USE

CROSS-REFERENCE TO RELATED APPLICATIONS

The present application claims priority from Czech patent Application No. PV 2017-663 filed on Oct. 17, 2017, the entire contents of which are incorporated herein by reference.

FIELD OF APPLICATION

The presented invention applies to the method of production of stable porous coordination polymers (metal-organic framework—MOF) consisting of metal centres linked using organic ligands—linkers based on phosphinic acids that contain two or more phosphinic groups, and their resulting crystalline structure contains pores.

These materials can be used for storing of gases or separation of gases, for preparation of membranes, heterogeneous catalysts, sorbents, lithium batteries, of proton conductors and of drug carriers and they also find application in analytical chemistry as sensors of gases, ions or organic or biologically active substances.

STATE OF THE ART

MOFs, thus Metal Organic Frameworks, are hybrid highly porous compounds consisting of inorganic parts (metal ion or cluster) linked with organic linkers which form coordination links to inorganic parts using donor groups while forming crystal structures (D. J. Tranchemontagne, J. L. Mendoza-Cortés, M. O'Keeffea, O. M. Yaghi, Secondary building units, nets and bonding in the chemistry of metal-organic frameworks, Chem. Soc. Rev. 38 (2009) 1257-1283). When compared with other substances, they are exceptional due to their variability. Using suitable inorganic parts and organic linkers, a material with the most different required properties, from size and shape of pores to electric and magnetic properties of the lattice can be designed and composed.

When compared with other porous crystalline materials, e.g. zeolites, MOFs can contain pores in the range of micropores (pore diameter <2 nm) or mesopores (pore diameter in range 2-50 nm) and their surface can be adjusted as hydrophilic or hydrophobic according to the combination of the selected metal and the type of linker. However, the opportunities to set size and share of hydrophobicity/hydrophilicity pores of MOF, for a given metal and length and structure of organic linker, have been very limited up to now. Moreover, most MOFs show low stability in aqueous medium, particularly at higher temperatures (M. Brichtová, P. Doležel, Struktura, vlastnosti a potenciál MOF, Chemagazin, No. 4, volume XX (2010)). Linkers of up to now described MOFs are mostly based on donor groups of acids, particularly of carboxyl, sulphonic or phosphonic ones, and also those based on heterocycles containing nitrogen. However, direct modification of these donor groups: of carboxyl, sulphonic and phosphonic acids with other organic groups, e.g. with alkyls or aryls which would allow to change the character of MOFs, is not possible. Only selection of a suitable spacer among the donor groups can have effect on size of pores of the material.

So called solvothermal techniques are used most frequently for synthesis of MOFs, i.e. they are prepared using synthesis of precursor of metal and organic ligand which are mostly diluted in high-boiling polar solvent and heated in a sealed vessel. The crystallization process is the most important one for the formation of the desired structures. Other options are the wet electrochemical method where the source of metal is an anode submerged in solution of carboxylates. Solvent-free synthesis of MOFs is also highly preferred. This can be carried out mechanically by grinding, where precursors of metal and organic linker are ground together and the rising by-products like water or low-molecular organic products are removed under raised temperature. After the substance is synthesised postsynthetic modification can follow where MOFs are modified without changing their topology, for example adjustments or replacements of organic linkers are carried out.

Recently MOFs have been frequently studied particularly because of their high application potential which involves storing or separation of gases, transport of drugs, heterogeneous catalysis, preparation of membranes, heterogeneous catalysts, parts of lithium batteries and proton conductors and utilisation in analytical chemistry in function of sensors of gases, ions or biologically active substances (B. Li, H.-M. Wen, W. Zhou, B. Chen, Porous Metal-Organic Frameworks for Gas Storage and Separation: What, H-low, and Why? J. Phys. Chem. Lett., 5 (2014) 3468-3479; A. H. Chughtai, N. Ahmad, H. A. Younus, A. Laypkov, F. Verpoort, Metal-organic frameworks: versatile heterogeneous catalysts for efficient catalytic organic transformations, Chem. Soc. Rev. 44 (2015) 6804-6849; M. G. Campbell, M. Dincă, Metal-Organic Frameworks as Active Materials in Electronic Sensor Devices, Sensors 17 (2017) 1108; P. Horcajada, R. Gref, T. Baati, P. K. Allan, G. Maurin, P. Couvreur, G. Férey, R. E. Morris, C. Serre, Metal-organic frameworks in biomedicine Chem. Rev. 112 (2012) 1232-1268). For example, nanocarriers are under development for treatment of cancer which allow efficient and controllable transport of a drug, e.g. of cis-platinum, in body. MOFs can also be used as a contrast agent in magnetic resonance.

The disadvantage of MOFs is their relatively low thermic, chemical and mechanical stability when compared with pure inorganic materials. Due to presence of an organic part, most MOFs are stable at maximum to some 500° C. The above handicap lies in impossibility to modify the known linkers based on coordination groups of carboxyl, sulphonic or phosphonic acids. Linkers based on acids with phosphine groups have been used for preparation of coordination polymer only as monophosphinic acid (V. Moodley, L. Mthethwa, M. N. Pillay, B. Omondi, W. E. van Zyl, The silver(I) coordination polymer $[AgO_2PPh_2]_n$ and unsupported Ag . . . Ag interactions derived from aminophosphonate and phosphinic acid, Polyhedron 99 (2015), 87-95) or diphosphinic acid where phosphine groups have been separated by methylene bridge (F. Cecconi, D. Dakternieks, A. Duthie, C. A. Ghilardi, P. Gili, P. A. Lorenzo-Luis, S. Midollini, A. Orlandini, Inorganic-organic hybrids of the p,p'-diphenylmethylenediphosphinate ligand with bivalent metals: a new 2D-layered phenylphosphinate zinc(II) complex, J. Solid State Chem. 177 (2004) 786-792) or 1,1'ferocendiyl bridge (R. Shekurov, V. Miluykov, O. Kataeva, D. Krivolapov, O. Sinyashin, T. Gerasimova, S. Katsyuba, V. Kovalenko, Y. Krupskaya, V. Kataev, B. Büchner, I. Senkovska, S. Kaskel, Reversible Water-induced Structural and Magnetic Transformations and Selective Water Adsorption Properties of Poly(manganese 1,1'-ferrocenediyl-bis(H-phosphinate)), Cryst. Growth Des. 16 (2016) 5084-5090) but in all cases, the prepared coordinating polymers have not shown porosity accessible to $N_2$ molecules.

SUMMARY OF THE INVENTION

The invention concerns the new types of porous coordination polymers (MOF) which have variable prepared pores with porosity up to 1200 m²/g available and the method of their preparation. The inorganic part of MOFs structure consists of trivalent cations of metals, represented above all by iron, aluminium, chromium or yttrium which are linked with organic linkers containing two to four phosphine groups bound to alkyl or aryl frame with general formula:

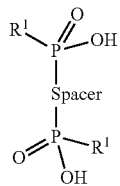

where $R^1$ is hydrogen, alkyl or aryl and possibly alkyl or aryl carrying a functional group, or it substitutes the second bond of phosphorus to spacer.

Preferably, spacer is formed of aromatic phosphinic acids where two, at least, of phosphinic groups of linker take part in bond to trivalent metal, and therefore they are not a free part of spacer and the remaining, one or two phosphine groups form an indivisible part of spacer, they do not take part in branched polymer bonds to the metal but they intervene in the pore space and this way they modify its space.

Example of Phosphine Acid:

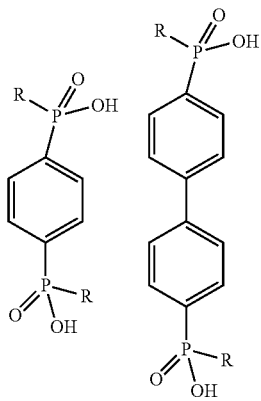

and of its spacer:

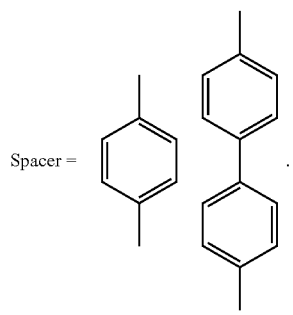

It is advantageous to compose spacers of these phosphinic acids:

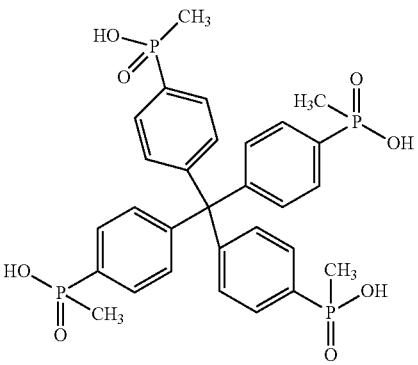 [SMILES: CP(=O)(O)c1ccc(C(c2ccc(P(C)(=O)O)cc2)(c2ccc(P(C)(=O)O)cc2)c2ccc(P(C)(=O)O)cc2)cc1]

tetraphenylmethane-4',4'',4''',4''''-tetrakis(R phosphinic acid)—TPMTPA(R)

It is advantageous if spacer of TPMTPA(R) contains two free phosphine groups, other two phosphine groups are not a part of spacer but they bond to the trivalent metal.

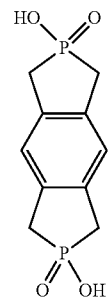 [SMILES: O=P1(O)Cc2cc3c(cc2C1)CP(=O)(O)C3]

1,2,3,5,6,7-hexahydrophospholo[3,4-f]isophosphindole-2,6-diol-2,6-dioxide

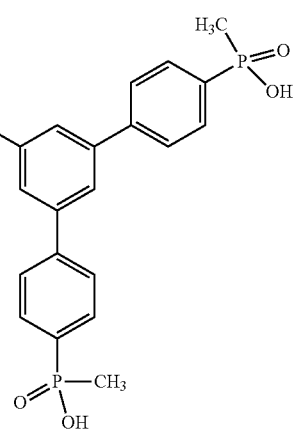

1,3,5-triphenylbenzene-4',4'',4'''-tris(R phosphinic acid)—TPBTPA(R)

It is advantageous if spacer of TPBTPA(R) contains no free phosphine groups, that are a part of spacer but all three bond to the trivalent metal.

Specific material with suitable size of pores adequate to the selected active substance can be created of MOFs, and it is able to contain a large amount of this substance, and therefore much higher portion of the drug to quantity of carriers can be achieved. The change of substituent $R^1$, $R^2$ or $R^3$ itself can have an effect on or control size of pores. The significant benefit of the new MOFs is their environmental, bioapplication potential and high chemical stability.

The MOFs have been prepared through synthesis of salts of trivalent cations of metals $M^{3+}$, the sources of which are aluminium, chromium, iron or yttrium salts, advantageous if in the form of chlorides, nitrates or sulphates with linkers carrying two to four phosphine groups under presence of solvent. Typical linkers are bivalent phosphine acids, like phenylene-1,4-bis(R phosphinic acid) (PBPA) and biphenylene-4,4'-bis(R phosphinic acid), and also tris- or tetraphosphine acids. It is advantageous to use linkers carrying alkyl, aryl chain or functional groups on aryl and possibly alkyl chain linking phosphine acid, e.g. 2-methylphenylene-1,4-bis(R phosphinic acid), and the above chains or functional groups can be represented by methyl, ethyl, i-propyl, phenyl, amino or nitro groups, and also by heterocycle (e.g. pyridine), thio, sulphonate or cyano groups, halogens, and the like. It is advantageous if some phosphine groups of tris and tetraphosphinic acids can stay free without binding to the trivalent metal where they are used for further modelling of size and arrangement of pores.

With advantage, linker may be modified by R bonded to phosphor, where R is methyl, ethyl, i-propyl, phenyl, amino or nitro group, furthermore by a heterocycle (e.g. pyridine), thio, sulfonate or cyano group or halogens.

The optimum range of share of $M^{3+}$ and phosphinic groups is 1:2 to 1:8, and it is advantageous if 1:4, where concentration is advantageous if $M^{3+}$ being 0.001 mol to 0.02 mol/l. Polymerysation of phosphinic acid and $M^3$ salt runs in solvent during heating. After adding the solvent, the suspension is heated in an autoclave or in glass vials at temperatures from 25° C. to 250° C. for 24 hours, at least, without stirring or with stirring. Water, organic solvents or organic acids, for example N,N-dialkyl formamide, formamide, acetone, hexane, acetonitrile, toluene, dimethylsulphoxide, N-methyl-2-pyrrolidone, tetrahydrofuran, formic acid and benzoic acid can be used as the solvent, and it is advantageous if it is ethanol (EtOH) and N,N-dimethyl formamide, or mixtures of these solvents. Selection of combination of solvent, share of $M^{3+}$ to phosphine acid, temperature and time for synthesis is very important, if unsuitable conditions and solvent are selected, regular structure need not appear, or can form non-porous coordination polymers.

After cooling, the resulting suspension is centrifuged, and it is advantageous if this is done under 10000 rpm for 5 minutes, at least, and the product deposit is separated through decantation. The product is washed first with water or ethanol, in two repeats, at least, and then the product is washed with acetone, also in two repeats, at least. Finally, the product is dried on air under laboratory temperature.

The general structure of prepared MOFs, for example for coordination polymer of bis-phosphinic acid and trivalent metals with resulting share of metal to phosphinic groups in ratio 1:3

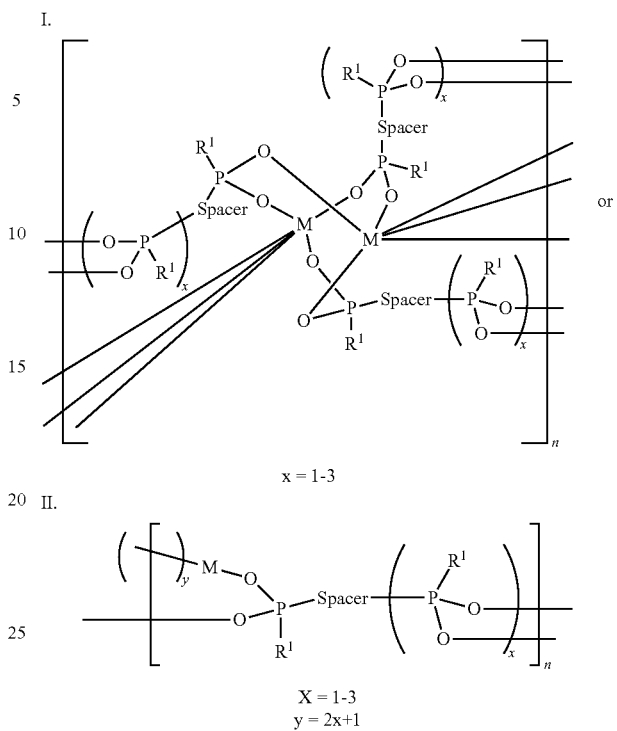

I.

x = 1-3

II.

X = 1-3
y = 2x+1 where $R^1$ is hydrogen, alkyl or aryl, and possibly alkyl or aryl carrying a functional group, M is a trivalent metal.

The structure of prepared MOFs was tested using x-ray powder diffraction (XRD) using CoKα radiation. The measured graphs show that the prepared MOFs correspond to the MOF structure containing Fe and phenylene-1,4-bis(R phosphinic acid) or to that with biphenylene-1,4-bis(R phosphine acid). We have compared MOFs with aluminium, chromium, iron and yttrium prepared of phenylene-1,4-bis(methylphosphinic acid) one with another, the diffraction lines of all measurements have been almost equal, thus all the prepared MOFs have shown the analogical structure.

Further, the specific surface of MOFs and their porousness have determined, they have been characterised by adsorption isotherm of nitrogen. The adsorption isotherm of nitrogen has been investigated at temperature 77 K. After the equilibrium has set where the pressure of adsorbate (gas) has not changed any more, we have calculated the quantity of adsorbate that had adsorbed from the gas phase from the final pressure, capacity of the vessel with adsorbent (MOF) and size of adsorbate dose. This procedure has been repeated for further doses of adsorbate until, after the adsorption equilibrium had been established, the pressure has been very close to the saturated vapor pressure of the adsorbate at the measurement temperature. Their porousness has been established from rise and shape of the isotherm curve using the NLDFT method or the HK-plot method, and their specific surface using the t-plot or BET methods, it has ranged from 220 $m^2/g$ to 1200 $m^2/g$. Porous MOFs that have contained pores with micropores with size less 2 nm or mesopores with size 2-3 nm have been prepared. We have established that change of substituent $R^1$, $R^2$ or $R^3$, change of length of spacer bi-phosphinic acid and change of trivalent metal cation can be used to have effect on porosity of prepared MOF. Generally, we can say that MOFs prepared advantageously of phenylene-1,4-bis(methylphosphinic acid) (PBPA) have contained pores of about 1 nm while MOFs prepared advantageously of biphenylene-4,4'-bis(methylphosphinic acid) (BBPA) (BBPA) have contained pores larger, around 2 nm, and also linking a bigger substituent to the phosphine group makes the pore size lesser.

Further, we have determined stability of the MOFs prepared using thermogravimetric analysis. We have exposed the prepared MOFs to temperature load in oxidizing or inert atmosphere and followed change of weight on microscales. We have raised the temperature gradually with rate 5° C./min. We have found that the prepared MOFs are stable approximately till 450° C. in the air atmosphere and in some cases till 500° C. in the argon atmosphere.

Finally, we have tested application possibilities of the resulting MOFs namely storing of hydrogen and $CO_2$ into their pores. We have found that hydrogen and $CO_2$ adsorbs inside formed pores and it is possible to store it in the pores.

BRIEF DESCRIPTION OF THE DRAWINGS

In figures R=alkyl or aryl group, e.g. Me, i-Pr, Ph.
FIG. 1A: Structural formula of phenylene-1,4-bis(R phosphinic acid),
FIG. 1B: Structural formula of biphenylene-4,4'-bis(R phosphinic acid),
FIG. 2A: Monomer unit of coordination polymer of phosphine acid with bis-phosphinic acid.

DETAILED DESCRIPTION OF THE INVENTION

Examples of Invention Completion

Example 1

Preparation of Porous Fe-MOF with PBPA(Me)

Figure 2B:
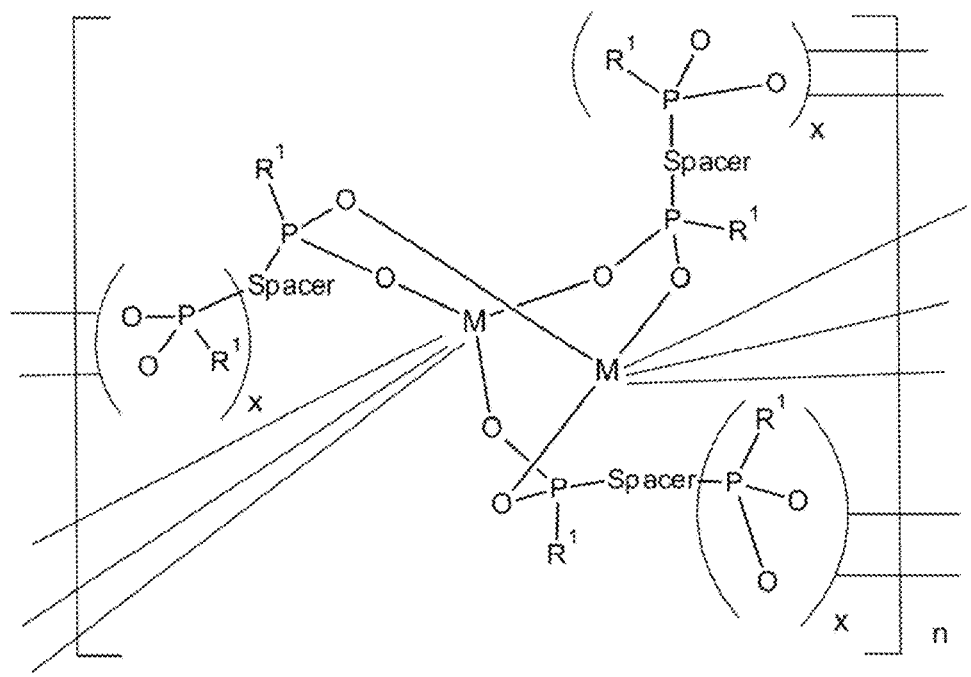
FIG. 2B: Monomer unit of coordination polymer of phosphine acid with two metal (M) with tris or tetra-phosphinic acid, where R1 substitutes the second bond of phosphorus to spacer.
Figure 2C:
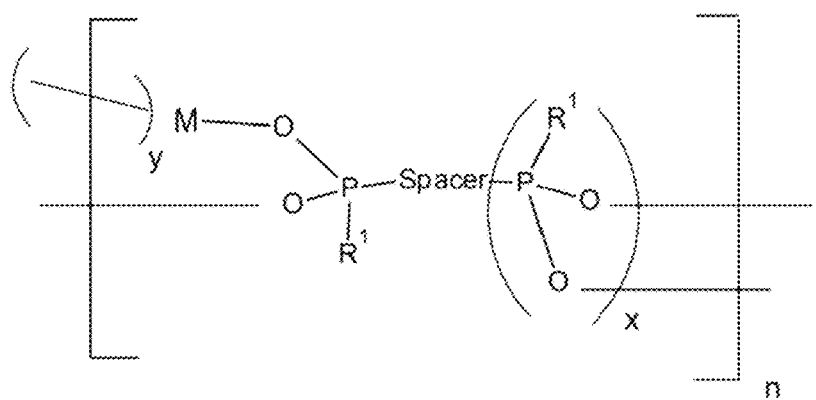
FIG. 2C: Monomer unit of coordination polymer of phosphine acid with one metal (M) with tris or tetra-phosphinic acid, where R1 substitutes the second bond of phosphorus to spacer.
Figure 3:
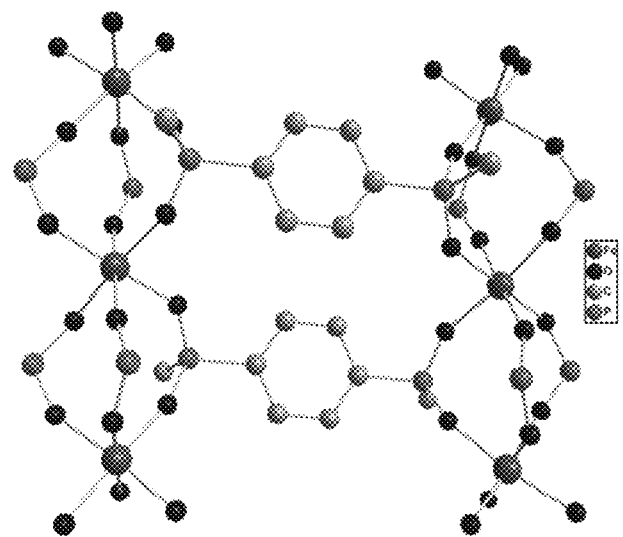
FIG. 3: Cut-off from structural formula of Fe-MOF with PBPA(Me)
Figure 4:
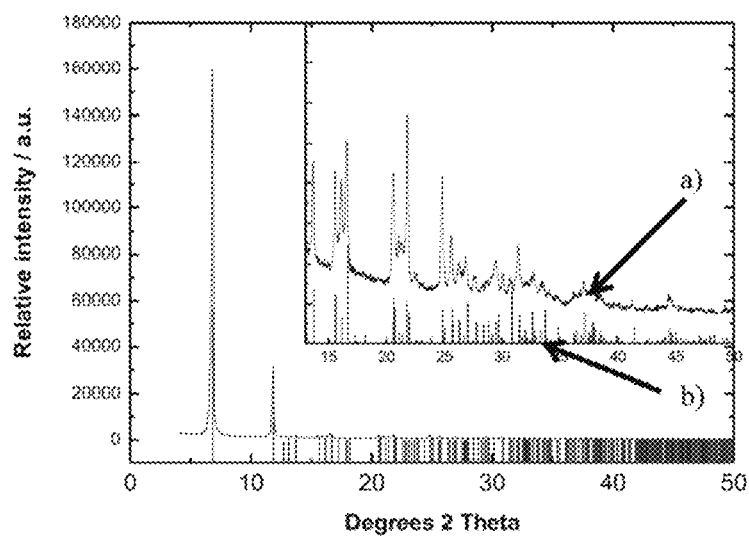
FIG. 4: Powder x-ray diffractogram (CoKα radiation) of a) Fe-MOF with PBPA(Me) compared with b) diffractogram calculated from the structure
Figure 5:
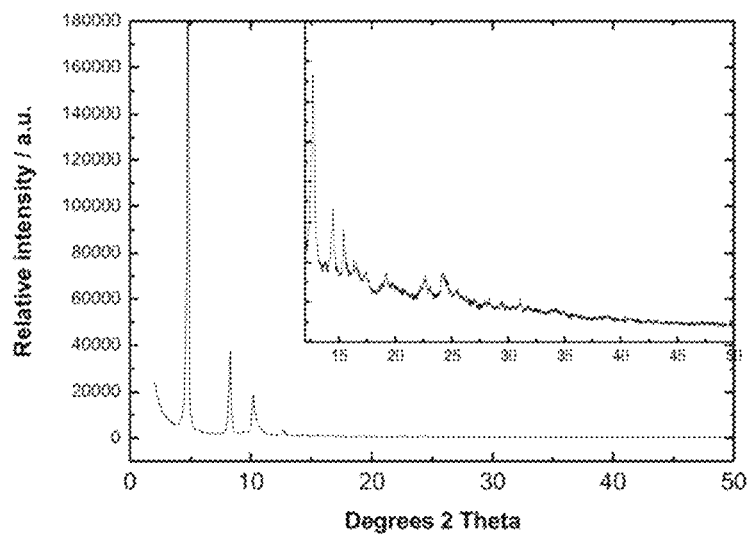
FIG. 5: Powder x-ray diffractogram (CoKα radiation) of Fe-MOF with BBPA(Me)
Figure 6:
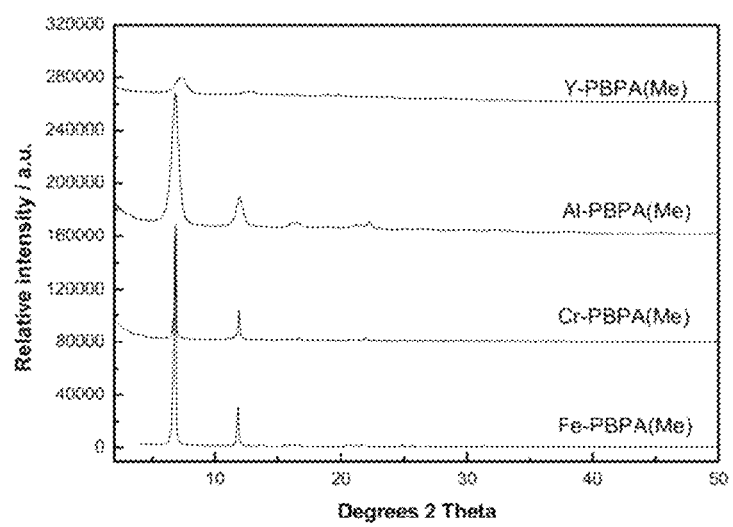
FIG. 6: Powder x-ray diffractogram (CoKα radiation) of Fe-MOF with PBPA(Me) and Cr-MOF with PBPA(Me) and of Al-MOF with PBPA(Me) and of Y-MOF with PBPA(Me)
Figure 7:
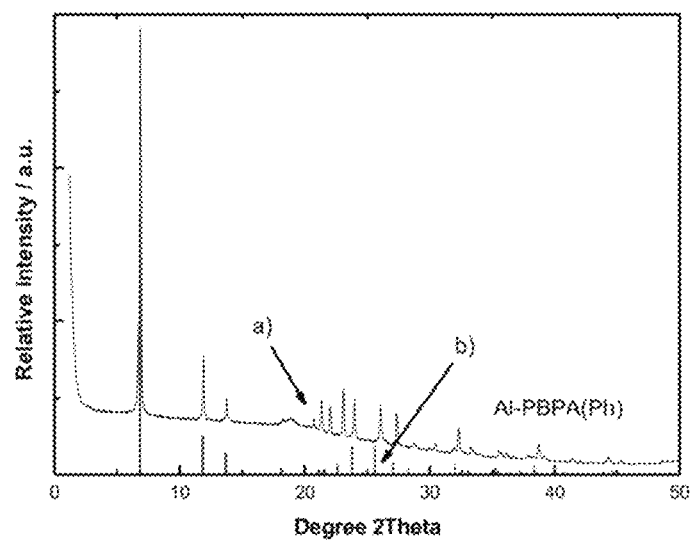
FIG. 7: Powder x-ray diffractogram (CoKα radiation) of a) Al-MOF with PBPA(Ph) compared with b) diffractogram calculated from the structure
Figure 8:
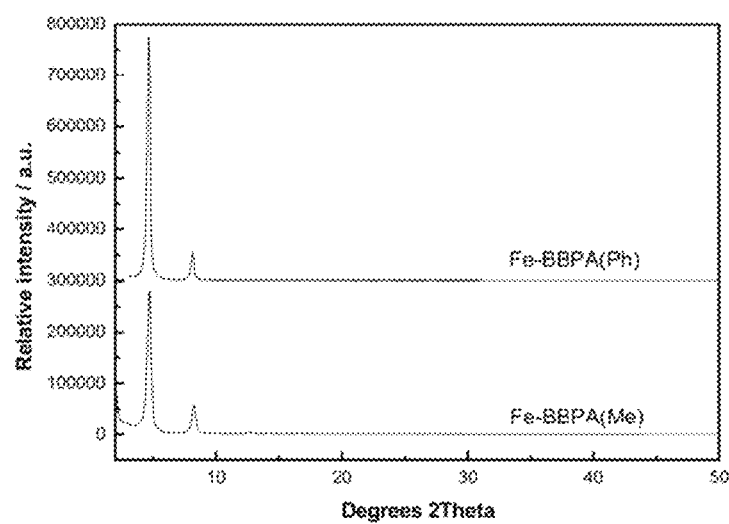
FIG. 8: Powder x-ray diffractogram (CoKα radiation) of Fe-MOF with BBPA(Me) and of Fe-MOF with BBPA(Ph)
Figure 9:
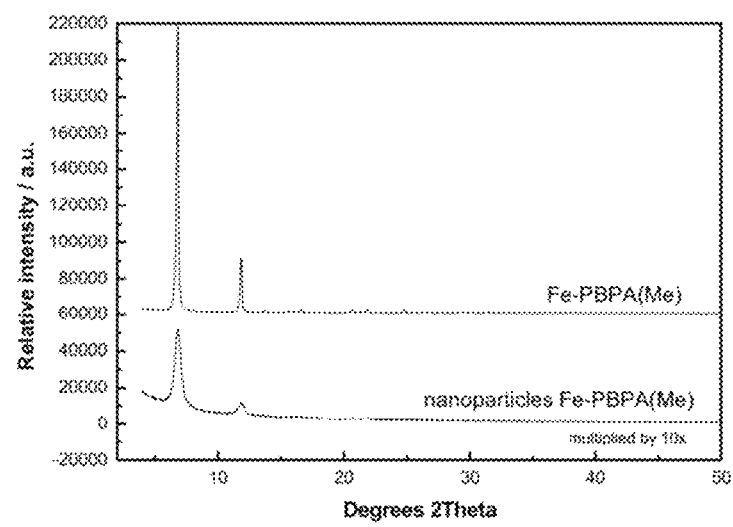
FIG. 9: Powder x-ray diffractogram (CoKα radiation) of Fe-MOF with PBPA(Me) in the form of nanoparticles and of Fe-MOF with PBPA(Me)
Figure 10:
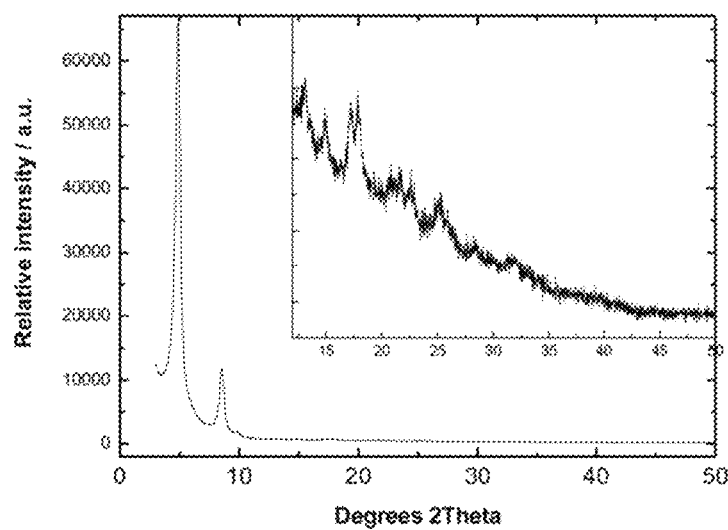
FIG. 10: Powder x-ray diffractogram (CoKα radiation) of Fe-MOF with BBPA($CH_2$=$CH_2$Ph)
Figure 11:
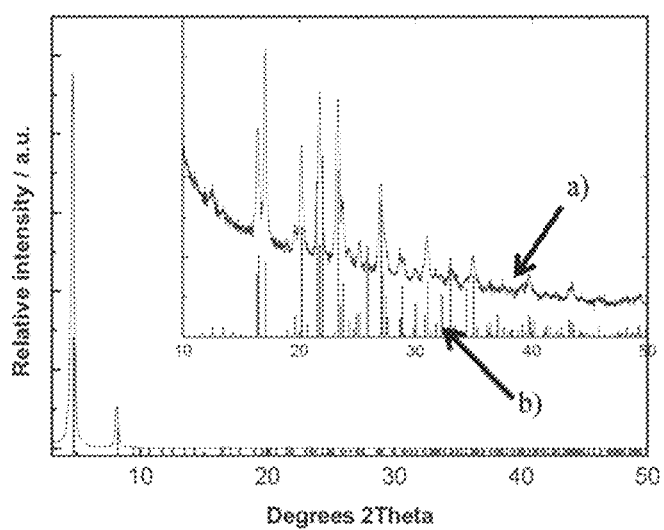
FIG. 11: Powder x-ray diffractogram (CoKα radiation) of a) Fe-MOF with BBPA(Ph) compared with b) diffractogram calculated from the structure
Figure 12:
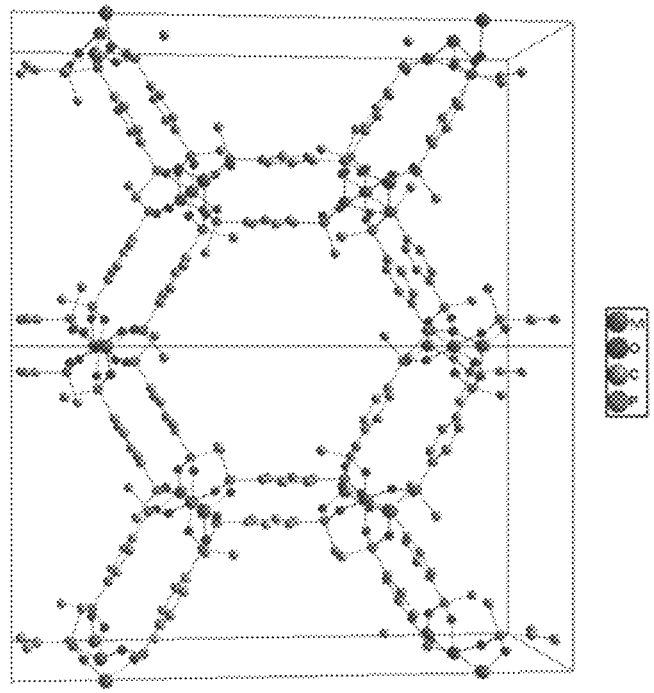
FIG. 12: Structure of MOF with PBPA(Me)
Figure 13:
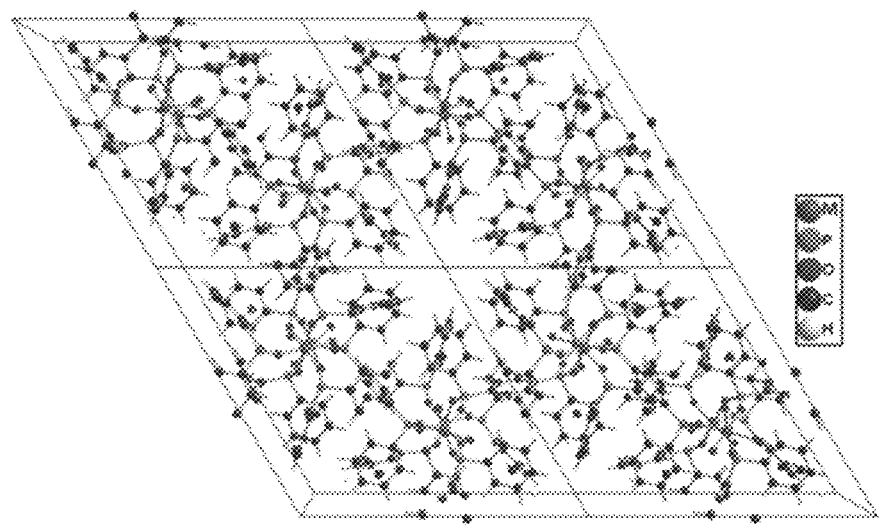
FIG. 13: Structure of MOF with PBPA(Ph)
Figure 14:
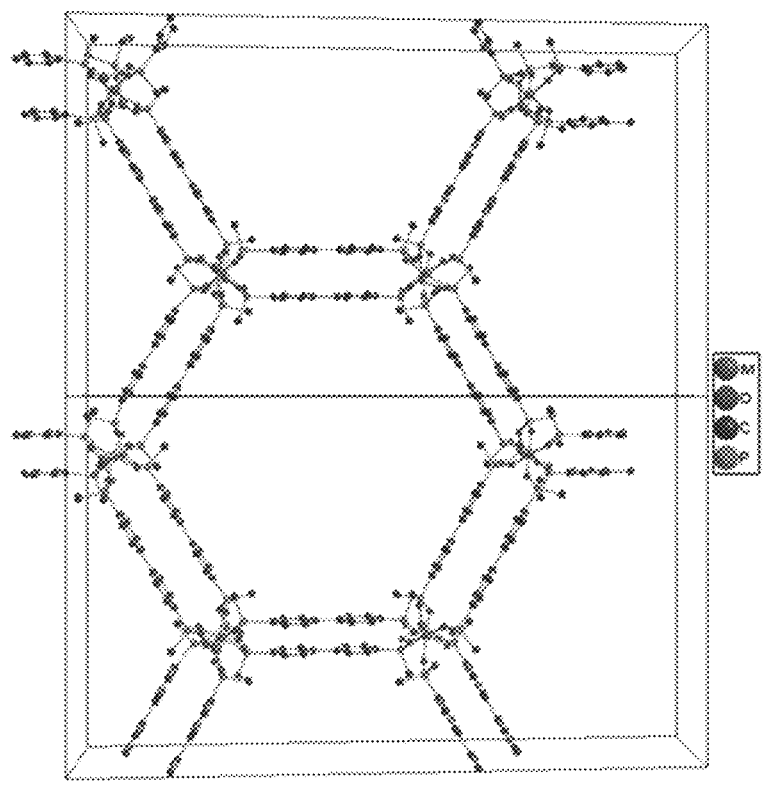
FIG. 14: Structure of MOF with BBPA(Me)
Figure 15:
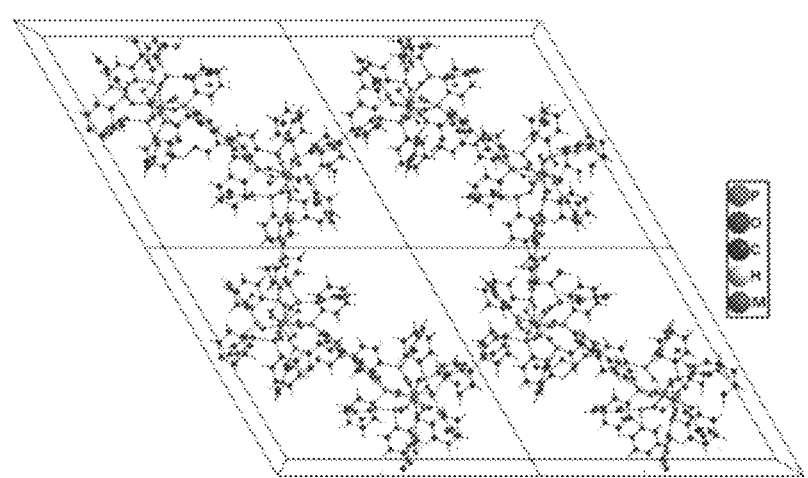
FIG. 15: Structure of MOF with BBPA(Ph)
Figure 16:
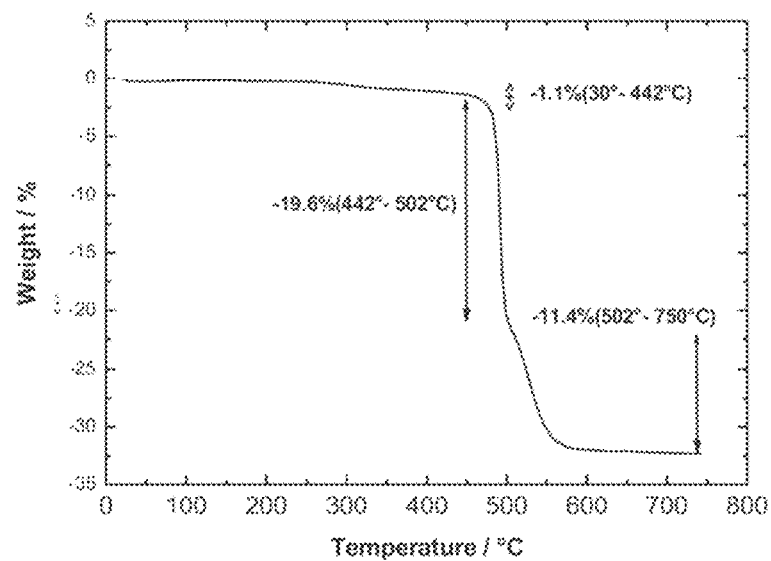
FIG. 16: Graph of thermogravimetric analysis of Fe-MOF with PBPA(Me)—air
Figure 17:
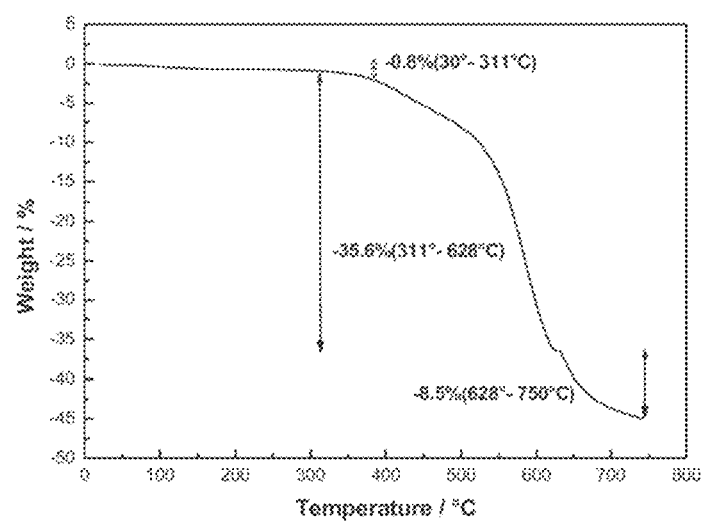
FIG. 17: Graph of thermogravimetric analysis of Al-MOF with PBPA(Ph)—air
Figure 18:
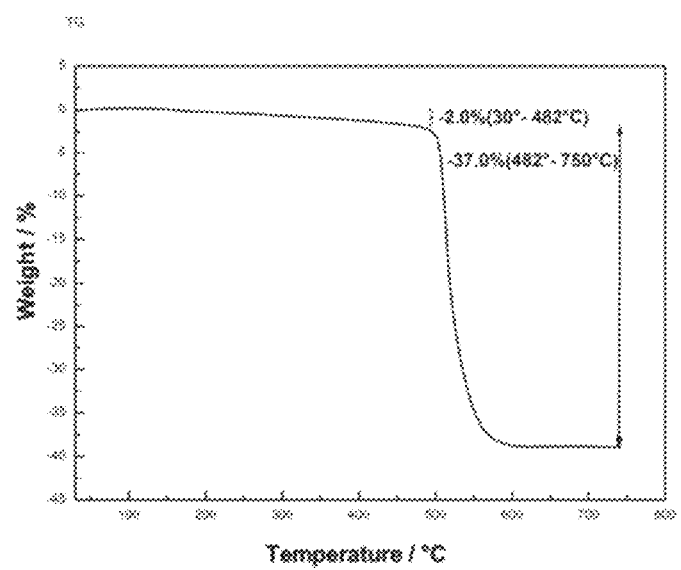
FIG. 18: Graph of thermogravimetric analysis of Fe-MOF with PBPA(Me)—argon
Figure 19:
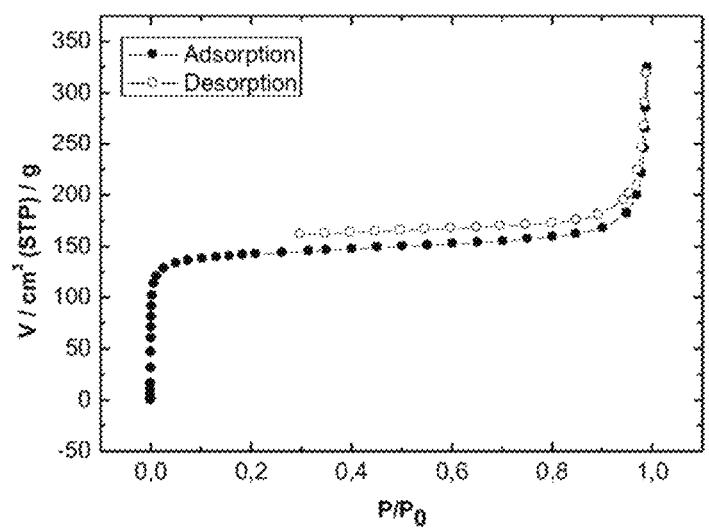
FIG. 19: Graph of adsorption isotherm of nitrogen by Fe-MOF with PBPA(Me), 77 K
Figure 20:
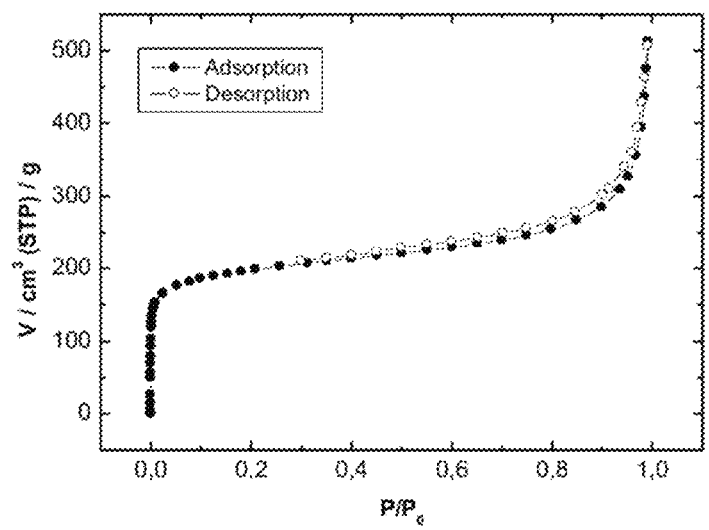
FIG. 20: Graph of adsorption isotherm of nitrogen by Al-MOF with PBPA(Me), 77 K
Figure 21:
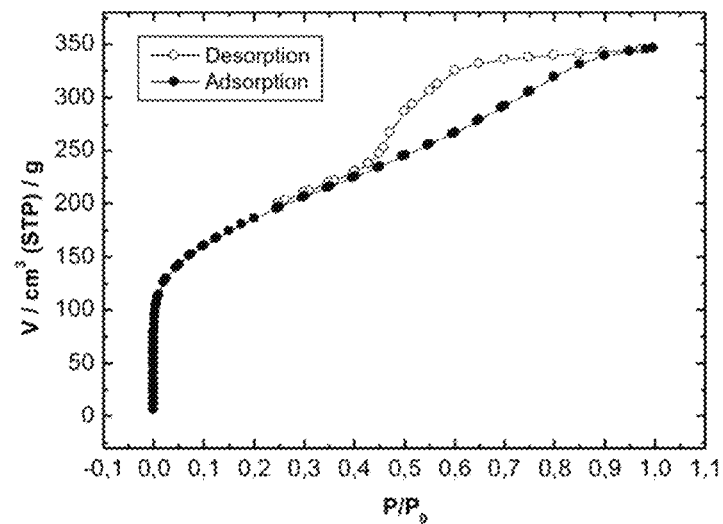
FIG. 21: Graph of adsorption isotherm of nitrogen by Y-MOF with PBPA(Me), 77 K
Figure 22:
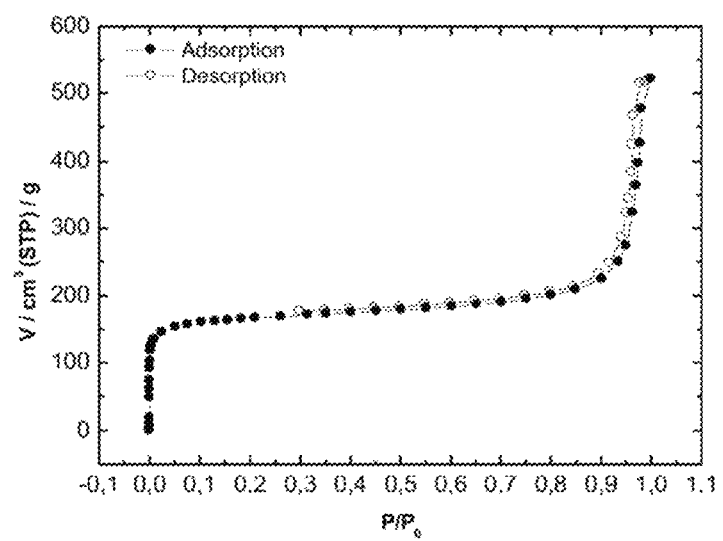
FIG. 22: Graph of adsorption isotherm of nitrogen by Cr-MOF with PBPA(Me), 77 K
Figure 23:
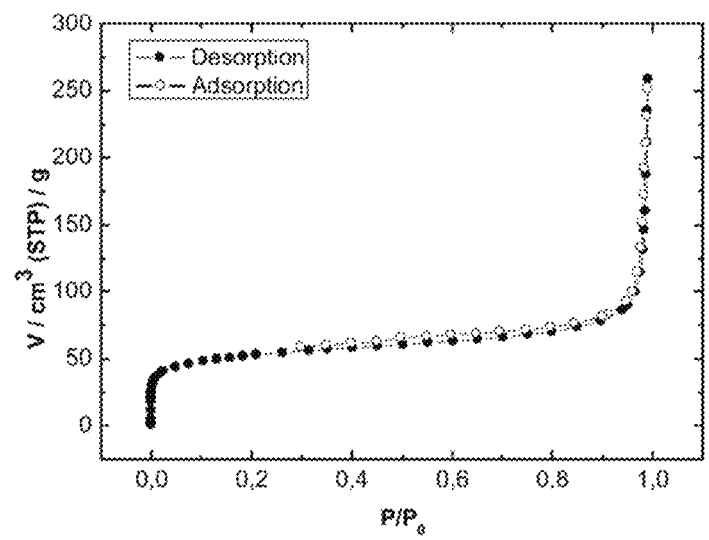
FIG. 23: Graph of adsorption isotherm of nitrogen by Al-MOF with PBPA(Ph), 77 K
Figure 24:
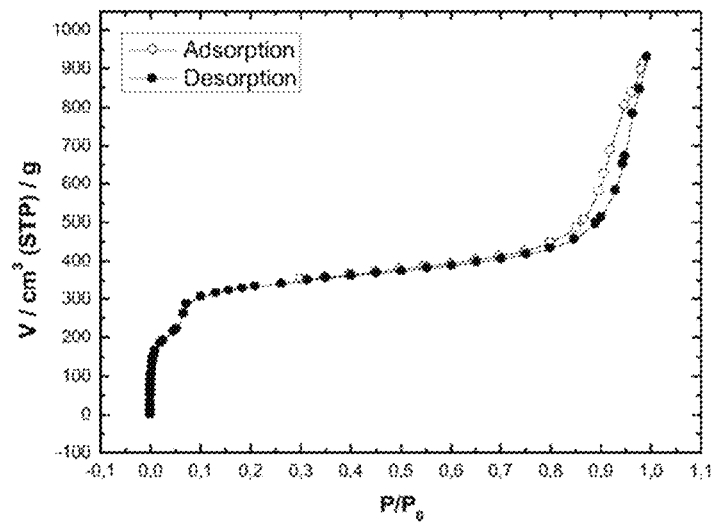
FIG. 24: Graph of adsorption isotherm of nitrogen by Fe-MOF with BBPA(Me), 77 K
Figure 25:
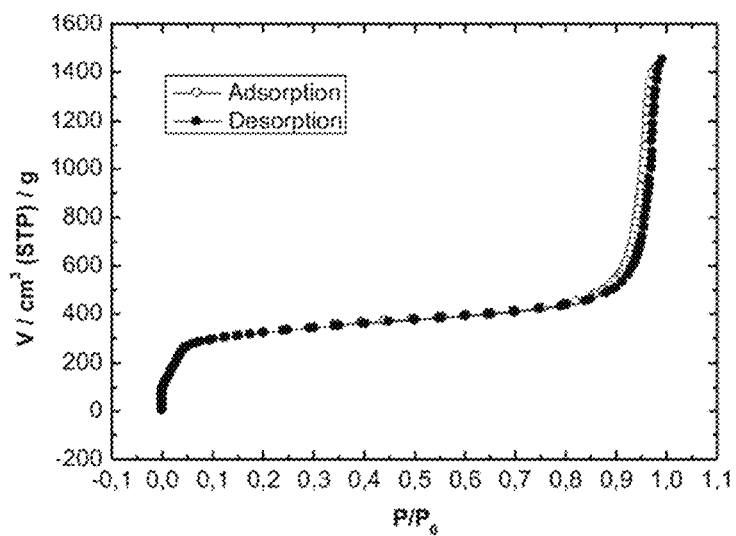
FIG. 25: Graph of adsorption isotherm of nitrogen by Fe-MOF with BBPA(Ph), 77 K
Figure 26:
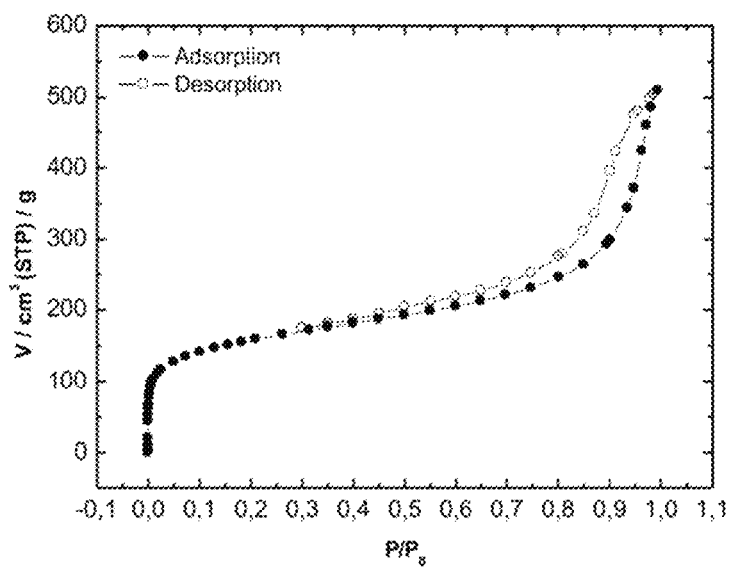
FIG. 26: Graph of adsorption isotherm of nitrogen by Fe-MOF with BBPA($CH_2$=$CH_2$Ph), 77 K
Figure 27:
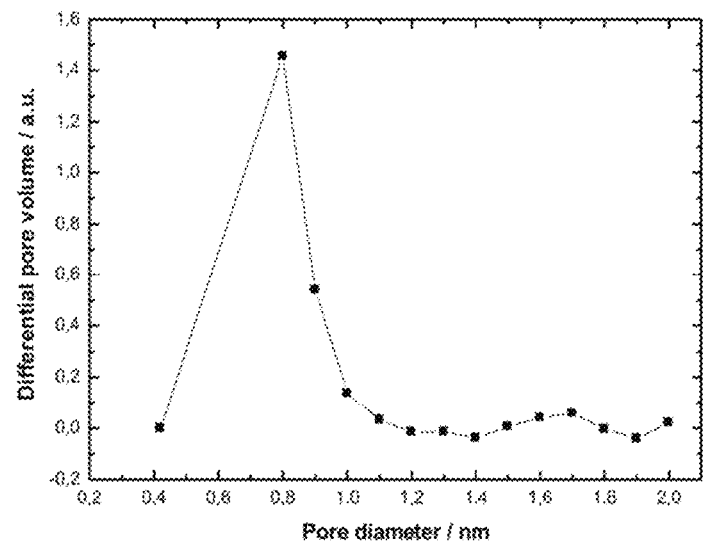
FIG. 27: Graph of pores distribution for Fe-MOF with PBPA(Me) calculated using HK-plot method
Figure 28:
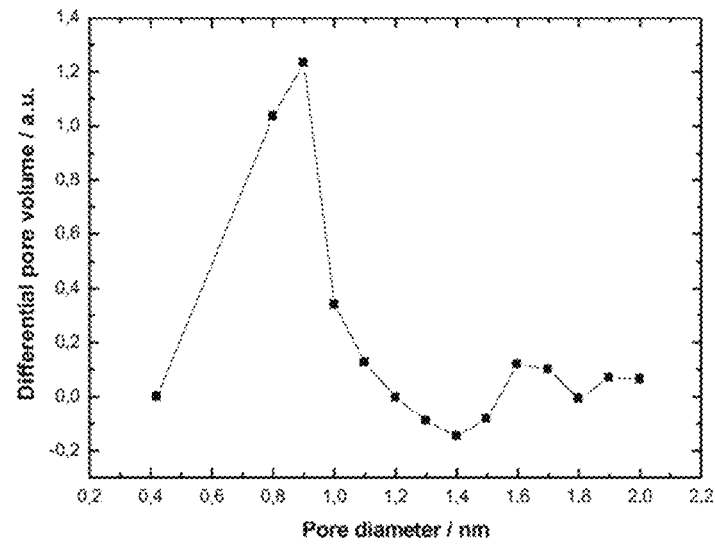
FIG. 28: Graph of pores distribution for Al-MOF with PBPA(Me) calculated using HK-plot method
Figure 29:
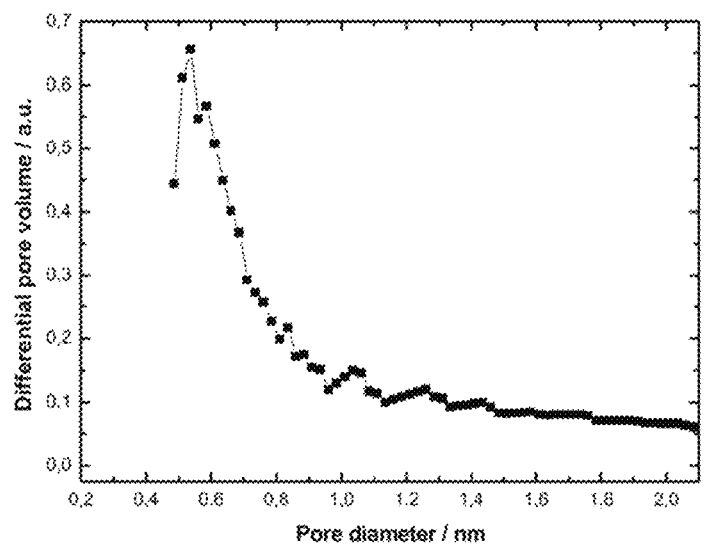
FIG. 29: Graph of pores distribution for Y-MOF with PBPA(Me) calculated using HK-plot method
Figure 30:
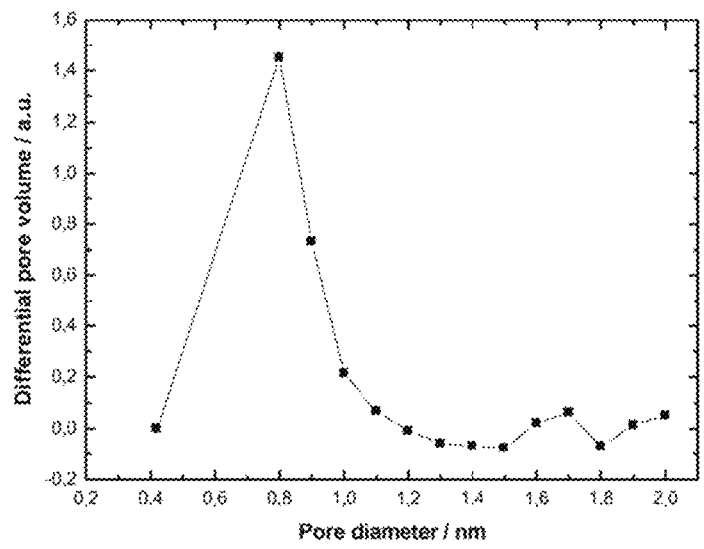
FIG. 30: Graph of pores distribution for Cr-MOF with PBPA(Me) calculated using HK-plot method
Figure 31:
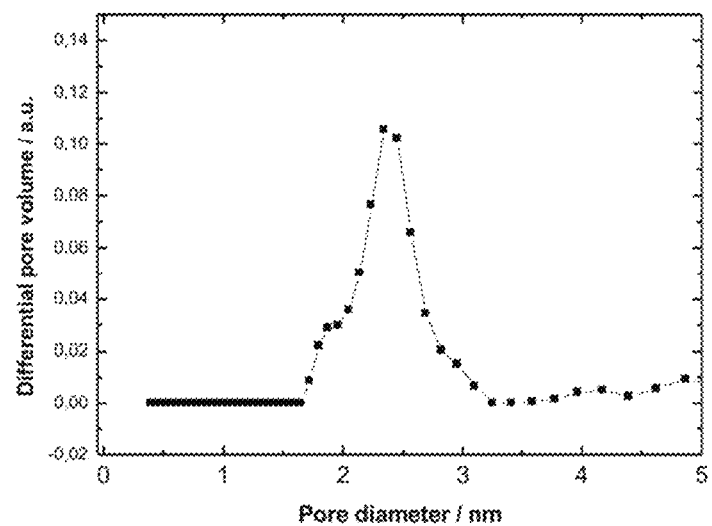
FIG. 31: Graph of pores distribution for Fe-MOF with BBPA(Me) calculated using NLDFT method
Figure 32:
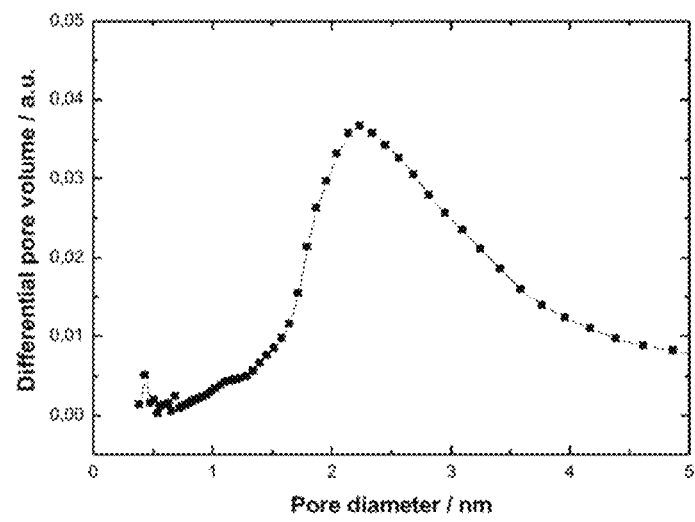
FIG. 32: Graph of pores distribution for Fe-MOF with BBPA(Ph) calculated using NLDFT method
Figure 33:
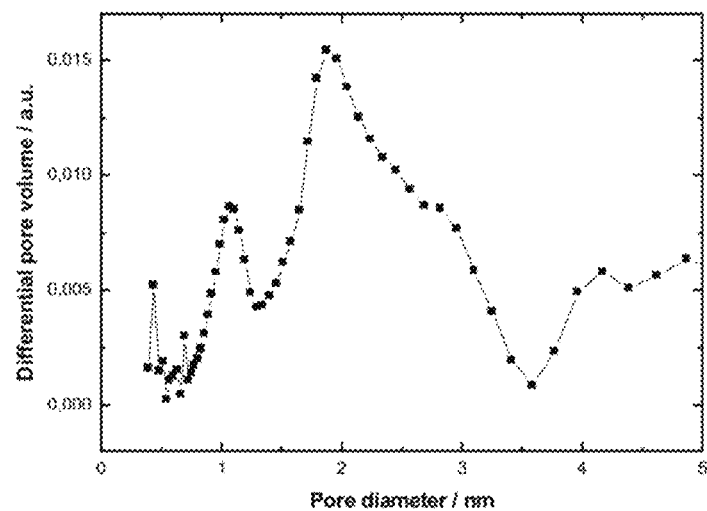
FIG. 33: Graph of pores distribution for Fe-MOF with BBPA($CH_2$=$CH_2$Ph) calculated using NLDFT method
Figure 34:
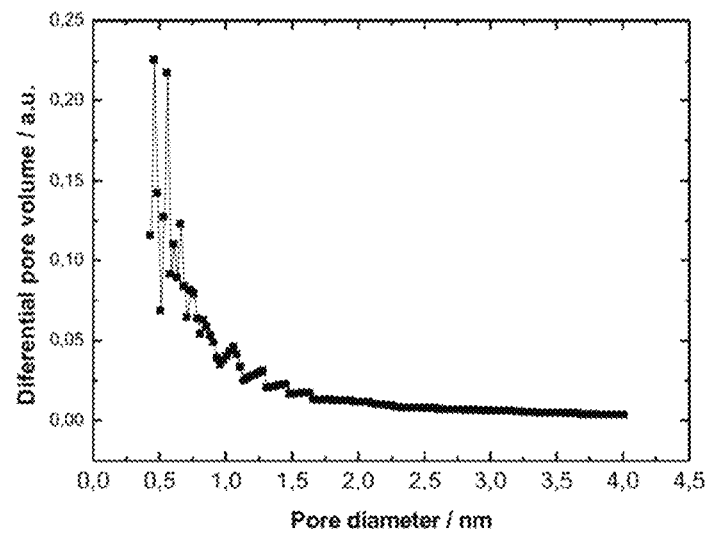
FIG. 34: Graph of pores distribution for Al-MOF with PBPA(Ph) calculated using HK-plot method
Figure 35:
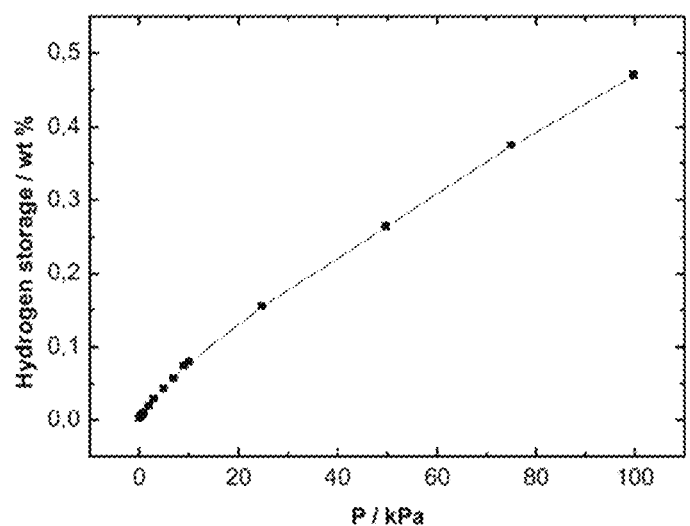
FIG. 35: Graph of adsorption isotherm of hydrogen by Fe-MOF with PBPA(Me), 77 K
Figure 36:
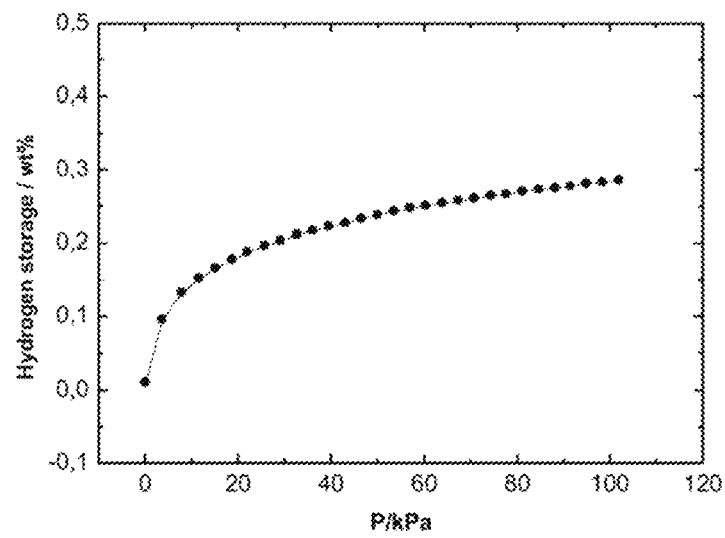
FIG. 36: Graph of adsorption isotherm of hydrogen by Al-MOF with PBPA(Ph), 77 K
Figures 37, 38:
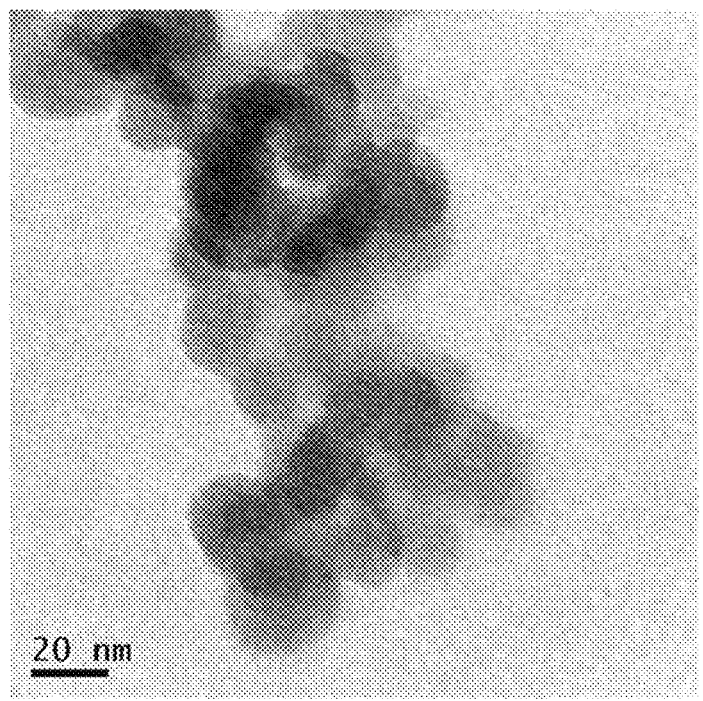
FIG. 37: Photos of nanoparticles of iron (III) phenylene-1,4-bis(methylphosphinate) from transmission electron microscope
FIG. 38: Table of prepared MOFs with their specific surface and porosity
Figure 39:
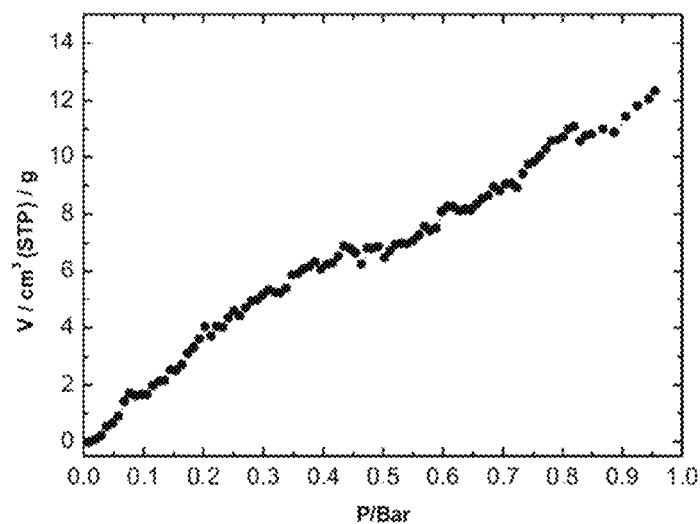
FIG. 39: Adsorption isotherm of CO2 of sample of Al-PBPA(Me) at 25° C.
Figure 40:
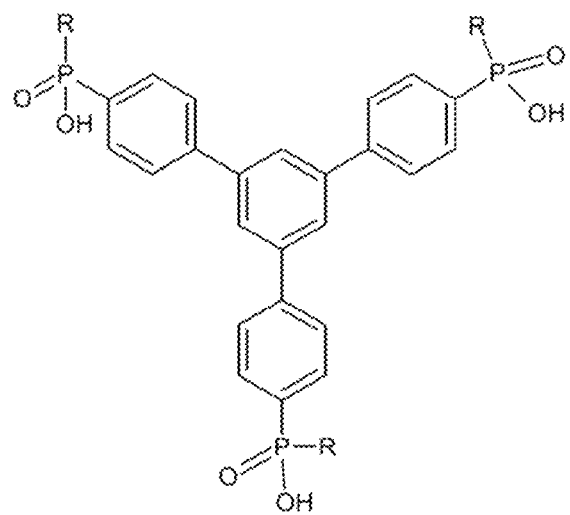
FIG. 40: Structural formula of 1,3,5-triphenylbenzene-4',4'',4'''-tris(R phosphinic acid)—TPBTPA(R)
Figure 41:
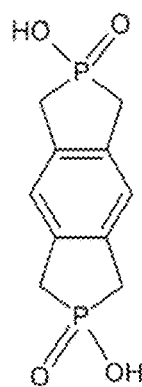
FIG. 41: Structural formula of 1,2,3,5,6,7-hexahydrophospholo[3,4-f]isophosphindole-2,6-diol 2,6-dioxide
Figure 42:
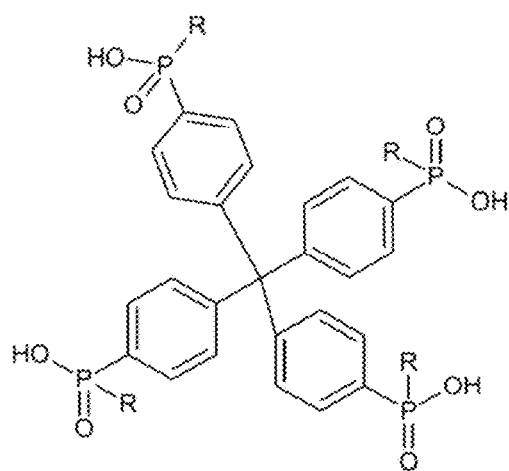
FIG. 42: Structural formula of Tetraphenylmethane-4',4'',4''',4''''-tetrakis(R phosphine acid)—TPMTPA(R)
Figure 43:
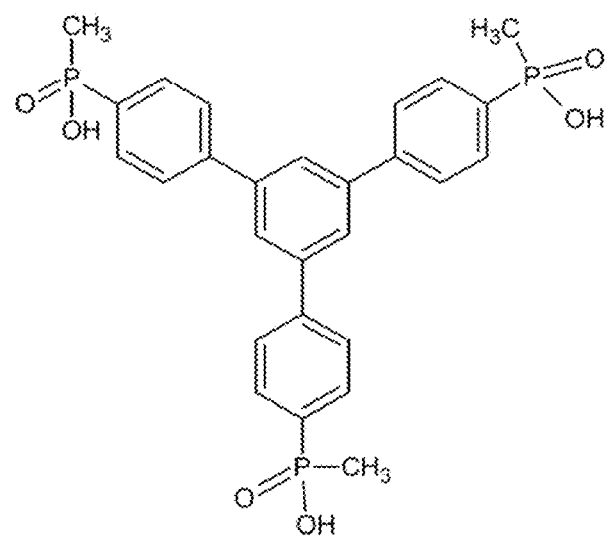
FIG. 43: Structural formula of 1,3,5-triphenylbenzene-4',4'',4'''-tris(methylphosphinic acid)—TPBTPA(Me)
Figure 44:
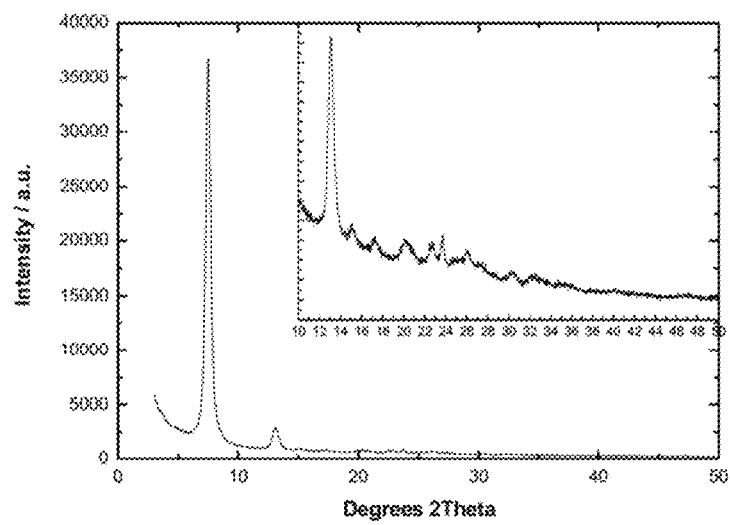
FIG. 44: Powder x-ray diffractogram (CoKα radiation) of Fe-MOF with TPBTPA(Me)
Figure 45:
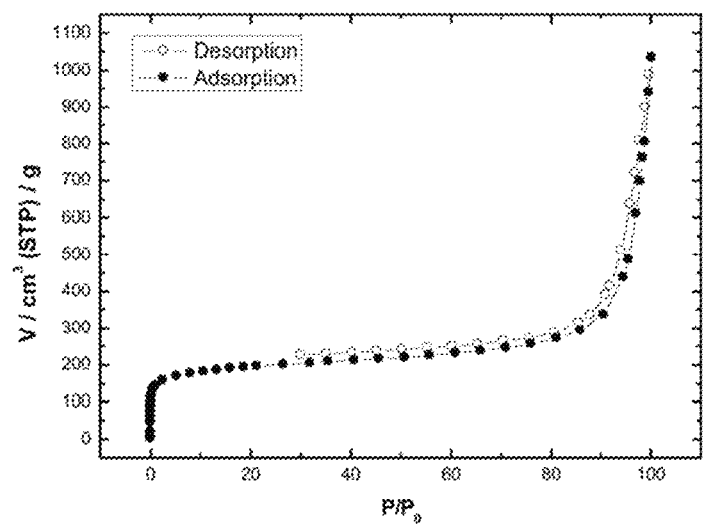
FIG. 45: Graph of adsorption isotherm of nitrogen by Fe-MOF with TPBTPA(Me), 77 K
Figure 46:
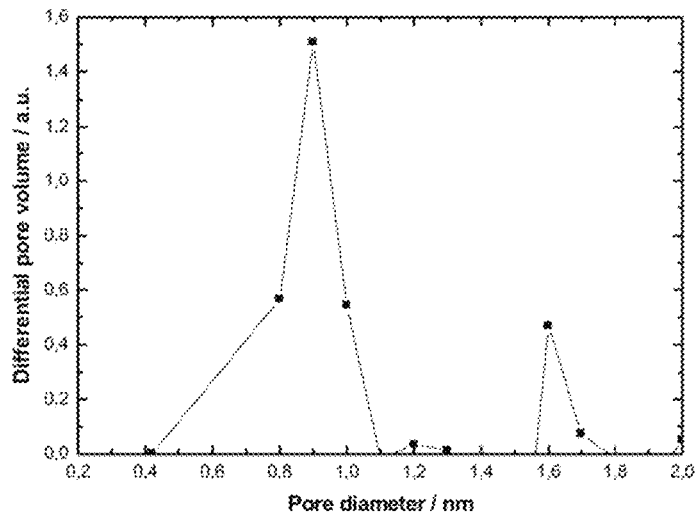
FIG. 46: Graph of pores distribution for Fe-MOF with TPBTPA(Me) calculated using HK-plot method
Figure 47:
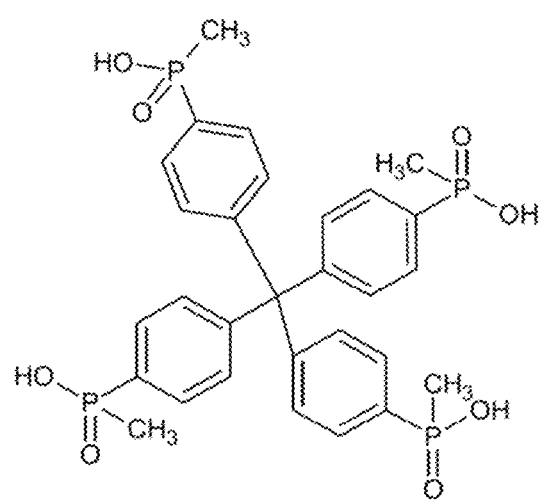
FIG. 47: Tetraphenylmethane-4',4'',4''',4''''-tetrakis(methylphosphinic acid)—TPMTPA(Me)
Figure 48:
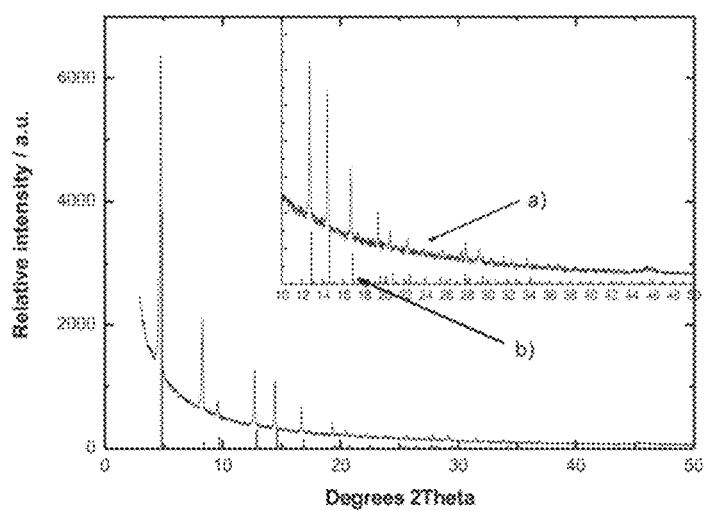
FIG. 48: Powder x-ray diffractogram (CoKα radiation) of a) Fe-MOF with PBPA(Me) compared with b) diffractogram calculated from the structure
Figure 49:
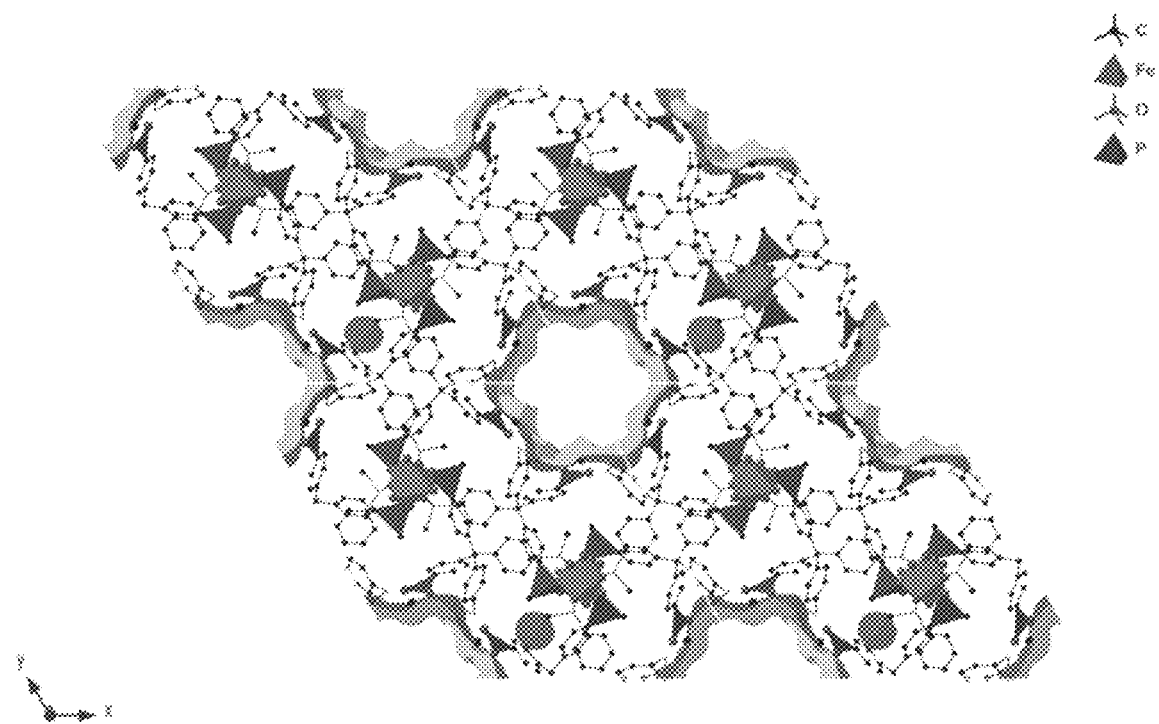
FIG. 49: Structure of MOF with TPMTPA(Me) with marked area of pores (solvent excluded area—yellow and red colours)

The initial suspension containing 18.8 mg of phenylene-1,4-bis(methylphosphinic acid)—PBPA(Me) with the amount of substance of 0.08 mmol, 10.8 mg $FeCl_3.6H_2O$ with the amount of substance of 0.04 mmol and 5 ml of anhydrous EtOH was heated in an autoclave with capacity of 50 ml with teflon inlet under autogenous pressure at 250° C. for 24 hours without stirring.

After the autoclave cooled, the resulting suspension was centrifuged at 10000 rpm for 5 minutes and the product deposit was separated through decantation. The product was washed first with water (3×30 ml) and acetone (3×30 ml) and it was dried in air at laboratory temperature. Coordination polymer of porous MOF with monomer unit iron (III) phenylene-1,4-bis(methylphosphinate) with weight of 10 mg was acquired. MOF was characterised using the adsorption isotherm of nitrogen, and from it its specific surface (using t-plot method) and porosity (using HK-plot method) were determined, and the specific surface was 712 $m^2/g$ and the diameter of pores was 0.8 nm.

Stability of Fe-MOF with PBPA(Me) was characterised with boiling of 20 mg of Fe-MOF with PBPA(Me) in 10 ml of $H_2O$ for 24 hours. Then the specific surface was measured, it was 582 $m^2/g$.

Example 2

Preparation of Porous Al-MOF with PBPA(Me)

The initial suspension containing 18.8 mg of phenylene-1,4-bis(methylphosphinic acid)—PBPA(Me) with the amount of substance of 0.08 mmol, 9.7 mg $AlCl_3.6H_2O$ with amount of substance of 0.04 mmol and 5 ml of anhydrous ethanol was heated in an autoclave with capacity of 50 ml with teflon inlet under autogenous pressure at 250° C. for 24 hours without stirring.

After the autoclave cooled, the resulting suspension was centrifuged at 10000 rpm for 5 minutes and the product deposit was separated through decantation. The product was washed first with water (3×30 ml) and acetone (3×30 ml) and it was dried in air at laboratory temperature. Coordination polymer of porous MOF with monomer unit aluminium phenylene-1,4-bis(methylphosphinate) with weight of 10 mg was acquired. MOF was characterised using the adsorption isotherm of nitrogen, and from it its specific surface (using t-plot method) and porosity (HK-plot) were determined, and the specific surface was 921 $m^2/g$ and the diameter of pores was 0.9 nm. Stability of Al-MOF with PBPA(Me) was characterised with boiling of 20 mg Al-MOF with PBPA(Me) in 10 ml of $H_2O$ in water for 24 hours. Then the specific surface was measured, it was 1038 $m^2/g$.

Example 3

Preparation of Porous Y-MOF with PBPA(Me)

The initial suspension containing 18.8 mg of phenylene-1,4-bis(methylphosphinic acid)—PBPA(Me) with the amount of substance of 0.08 mmol, 7.8 mg $YCl_3$ with the amount of substance of 0.04 mmol and 5 ml of anhydrous ethanol was heated in an autoclave with the capacity of 50 ml with teflon inlet under autogenous pressure at 250° C. for 96 hours without stirring.

After the autoclave cooled, the resulting suspension was centrifuged at 10000 rpm for 5 minutes and the product deposit was separated through decantation. The product was washed first with water (3×30 ml) and acetone (3×30 ml) and dried in air at laboratory temperature. Coordination polymer of porous MOF with monomer unit phenylene-1,4-bis(methylphosphinate) with weight of 10 mg was acquired. MOF was characterised using the adsorption isotherm of nitrogen, and from it its specific surface (using t-plot method) and porosity (HK-plot) were determined, and the specific surface was 711 $m^2/g$. MOF had wide distribution of pores and the diameter of pores was over 0.5 nm.

Example 4

Preparation of Porous Cr-MOF with PBPA(Me)

The initial suspension containing 18.8 mg of phenylene-1,4-bis(methylphosphinic acid)—PBPA(Me) with the amount of substance of 0.08 mmol, 10.6 mg $CrCl_3.6H_2O$ with the amount of substance of 0.04 mmol and 6 ml of water was heated in an autoclave with capacity of 50 ml with teflon inlet under autogenous pressure at 250° C. for 48 hours without stirring.

After the autoclave cooled, the resulting suspension was centrifuged at 10000 rpm for 5 minutes and the product deposit was separated through decantation. The product was washed first with water (3×30 ml) and acetone (3×30 ml) and dried in air at laboratory temperature. Coordination polymer of porous MOF with monomer unit chromium (III) phenylene-1,4-bis(methylphosphinate) with weight of 10 mg was acquired.

MOF was characterised using the adsorption isotherm of nitrogen, and from it its specific surface (using t-plot method) and porosity (using HK-plot method) were determined, and the specific surface was 811 $m^2/g$ and the diameter of pores was 0.8 nm.

Example 5

Preparation of Porous Al-MOF with PBPA(pH)

The initial suspension containing 14.3 mg of phenylene-1,4-bis(phenylphosphinic acid)—PBPA(Ph) with the amount of substance of 0.04 mmol, 4.8 mg $AlCl_3.6H_2O$ with the amount of substance of 0.02 mmol and 5 ml of anhydrous ethanol was heated in an autoclave with the capacity of 50 ml with teflon inlet under autogenous pressure at 250° C. for 24 hours without stirring.

After the autoclave cooled, the resulting suspension was centrifuged at 10000 rpm for 5 minutes and the product deposit was separated through decantation. The product was washed first with water (3×30 ml) and acetone (3×30 ml) and it was dried in air at laboratory temperature. Coordination polymer of porous MOF with monomer unit aluminium phenylene-1,4-bis(phenylphosphinate) with weight of 10 mg was acquired. MOF was characterised using the adsorption isotherm of nitrogen, and from it its specific surface (using t-plot method) and the diameter of pores (using HK-plot method) were determined, and the specific surface was 224 $m^2/g$ and the diameter of pores was in range 0.4-0.6 nm.

Example 6

Preparation of Porous Fe-MOF with BBPA(Me)

The initial suspension containing 24.8 mg of biphenylene-4,4'-bis(methylphosphinic acid) BBPA(Me) with the amount of substance of 0.08 mmol, 10.8 mg $FeCl_3.6H_2O$ with the amount of substance of 0.04 mmol and 10 ml of N,N-dimethylformamide was heated at 120° C. for 72 hours without stirring.

After the resulting suspension cooled, it was centrifuged at 10000 rpm for 5 minutes and the product deposit was separated through decantation. The product was washed with ethanol (3×30 ml) and then acetone (3×30 ml) and dried in air at laboratory temperature. Coordination polymer of porous MOF with monomer unit iron (III) biphenylene-4,4'-bis(methylphosphinate) with weight of 15 mg was acquired. For the resulting MOF the adsorption isotherm of nitrogen was measured and specific surface (with BET method) and porosity (with NLDFT method for cylindric silicate pores calculated using program Belmaster™) were calculated, and the specific surface was 978 $m^2/g$, the total volume of pores was 1.57 $cm^3/g$ and the diameter of pores was 2.4 nm.

Example 7

Preparation of Porous Fe-MOF with BBPA(pH)

The initial suspension containing 34.8 mg of biphenylene-4,4'-bis(phenylphosphinic acid)—BBPA(Ph) with the amount of substance of 0.08 mmol, 10.8 mg $FeCl_3.6H_2O$ with the amount of substance of 0.04 mmol and 10 ml of anhydrous ethanol was heated in an autoclave with capacity of 50 ml with teflon inlet under autogenous pressure at 250° C. for 24 hours without stirring.

After the autoclave cooled, the resulting suspension was centrifuged at 10000 rpm for 5 minutes and the product deposit was separated through decantation. The product was washed with EtOH (3×30 ml) and then with acetone (3×30 ml) and dried in air at laboratory temperature. Coordination polymer of porous MOF with monomer unit iron (III) biphenylene-4,4'-bis(phenylphosphinate) with weight of 25 mg was acquired.

For the resulting MOF the adsorption isotherm of nitrogen was measured and specific surface (with BET method) and porosity (with NLDFT method for cylindric silicate pores calculated using program Belmaster™) were calculated, and the specific surface was 1172 $m^2/g$, the total volume of pores was 2.40 $cm^3/g$ and the diameter of pores was 2.2 nm.

Example 8

Preparation of Porous Fe-MOF with PBPA (Me) in the Form of Nanoparticles

The initial suspension containing 4.7 mg of phenylene-1,4-bis(methylphosphinic acid)—PBPA(Me) with the amount of substance of 0.02 mmol, 5.4 mg $FeCl_3.6H_2O$ with the amount of substance of 0.02 mmol and 10 ml of formamide was heated at 100° C. for 24 hours without stirring.

After the resulting suspension cooled, it was centrifuged at 10000 rpm for 10 minutes and the product deposit was separated through decantation. The product was washed first with water (3×10 ml) and then with anhydrous EtOH (2×10 ml) and the resulting nanoparticles were kept in the form of colloidal solution in anhydrous EtOH. Coordination polymer of porous MOF with monomer unit iron (III) phenylene-1,4-bis(methylphosphinate) with weight of 3 mg was acquired.

Example 9

Preparation of Porous Fe-MOF with BBPA ($CH_2$=$CH_2$pH)

19.5 mg of biphenylene-4,4'-bis(4-vinylphenylphosphinic acid)—BBPA($CH_2$=$CH_2$Ph) with the amount of substance of 0.04 mmol and 5.4 mg of $FeCl_1.6H_2O$ with the amount of substance of 0.02 mmol was suspended in 10 ml of formic acid. The resulting mixture was stirred in a vial at temperature 30° C. for 48 hours.

After stirring was finished, the resulting suspension was centrifuged at 10000 rpm for 5 minutes and the product deposit was separated through decantation. The product was washed with EtOH (3×30 ml) and then acetone (3×30 ml) and dried in air at laboratory temperature. Coordination polymer of porous MOF with monomer unit iron (III) biphenylene-4,4'-bis(4-vinylphenylphosphinate) with weight of 10 mg was acquired.

For the resulting MOF the adsorption isotherm of nitrogen was measured and specific surface (with BET method) and porosity (with NLDFT method for cylindric silicate pores calculated using program Belmaster™) were calculated, and the specific surface was 569 $m^2/g$, the total volume of pores was 0.88 $cm^3/g$ (NLDFT) and the diameter of pores was 1.9 nm.

Example 10

Preparation of Porous Fe-MOF with TPBTPA(Me)

The initial suspension containing 14.0 mg of 1,3,5-triphenylbenzene-4',4'',4'''-tris(methylphosphinic acid)—TPBTPA(Me) with the amount of substance of 0.026 mmol, 4.0 mg of $FeCl_3.6H_2O$ with the amount of substance of 0.015 mmol and 10 ml of anhydrous ethanol was heated in an autoclave with capacity of 50 ml with teflon inlet under autogenous pressure at 250° C. for 24 hours without stirring. After the autoclave cooled, the resulting suspension was centrifuged at 10000 rpm for 5 minutes and the product deposit was separated through decantation. The product was washed with ethanol (3×30 ml) and then with acetone (3×30 ml) and it was dried in air at laboratory temperature. Coordination polymer of porous MOF with monomer unit iron (III) 1,3,5-triphenylbenzene-4',4'',4'''-tris(methylphosphinate) with weight of 7 mg was acquired.

MOF was characterised using the adsorption isotherm of nitrogen, and from it its specific surface (using t-plot method and porosity (HK-plot) were determined, and the specific surface was 869 $m^2/g$ and the diameter of pores was 0.9 nm.

Example 11

Preparation of Porous Fe-MOF with TPMTPA(Me)

The initial suspension containing 11.7 mg of tetraphenylmethane-4',4'',4''',4''''-tetrakis(methylphosphinic acid)—TPMTPA(Me) with the amount of substance of 0.02 mmol, 5.4 mg of $FeCl_3.6H_2O$ with the amount of substance of 0.02 mmol and 10 ml of $H_2O$ was heated in an autoclave with capacity of 50 ml with teflon inlet under autogenous pressure at 250° C. for 24 hours without stirring. After the autoclave cooled, the resulting suspension was centrifuged at 10000 rpm for 5 minutes and the product deposit was separated through decantation. The product was washed with ethanol (3×30 ml) and then with acetone (3×30 ml) and it was dried in air at laboratory temperature. Coordination polymer of porous MOF with monomer unit iron (III) tetraphenylmethane-4',4'',4''',4''''-tetrakis(methylphosphinic acid) with weight of 5 mg was acquired.

MOF was characterised using the powder x-ray diffraction and its structure was found using electron diffraction tomography.

Example 12

Comparison of Porosity of Prepared MOFs

Fe-MOF with BBPA(Me) produced according to Example 5 was compared with Fe-MOF with BBPA(Ph) that was prepared according to Example 6. The size of pores of Fe-MOF with BBPA(Ph) was 0.2 nm less when compared with Fe-MOF with BBPA(Me). This shows that if the substituent at the $R^1$ position is phenyl, this will shrink size of pores when compared with substitution with methyl.

Fe-MOF with PBPA(Me) produced according to Example 1 was compared with Al-MOF with PBPA(Me) that was prepared according to Example 2, with Y-MOF with PBPA(Me) produced according to Example 3 and with Cr-MOF with PBPA(Me) produced according to Example 4. The applied method of measurement could not determine porousness of Y-MOF with PBPA(Me), according to the resulting graph the porousness was over 0.5 nm. Fe-MOF with PBPA(Me), Al-MOF with PBPA(Me) and Cr-MOF with PBPA(Me) had pores of comparable size 0.8-0.9 nm which falls within the experimental error of the applied method and it indicates independence of size of pores on used metal.

Last but not least, Al-MOF with PBPA(Ph) prepared according to Example 4 was compared with Al-MOF with PBPA(Me) prepared according to Example 2. The size of pores of Al-MOF with PBPA(Ph) was 1 nm less than the size of pores in the structure of Al-MOF with PBPA(Me). Likely the size of pores of Al-MOF with PBPA(Ph) was almost equal to size of nitrogen atoms and thus the measurement was at the limits of the applied method. However, we can expect that the size of pores of Al-MOF with PBPA(Ph) is less than in MOF with a lesser substituent and this is methyl in the structure of Al-MOF with PBPA(Me).

Example 13

Analysis of Absorption of N2, H2 and CO2 in MOFs Samples

MOF—adsorbent $N_2$, $H_2$ and $CO_2$—adsorbate

We weighted a cuvette, poured a sample of prepared MOF inside, then the sample was evacuated at least 24 hours by 80° C. to remove residua of solvents and of air moisture. We weighted the cuvette again after the evacuation had finished, to determine the weight of the MOF specimen—adsorbent. Subsequently we filled it with known amount of adsorbate $N_2$, $H_2$ or $CO_2$, we measured the pressure in the cuvette corresponding to the amount of adsorbed adsorbate after the pressure in the cuvette was in equilibrium and we added more adsorbate up to pressure 0.95 bar. In case of sorption of $N_2$ we also measured desorption i.e. small quantity of gas-adsorbate was pumped out and we waited till the pressure stabilised down to 0.3 bar where we finished the experiment. We did the measurement with a device Belsorp max II (company MicrotracBel). Before the measurement we evacuated the samples at temperature 80° C. for 24 hours, at least, in order to remove residua of solvents and of air moisture. Then we evacuated the samples and gradually added adsorbate while monitoring pressure increase so that each point in the graph would correspond to the equilibrium conditions for that pressure. We measured up to 0.95 bar. Then we measured gas desorption for $N_2$ in a similar way, only the pressure was decreased down to 0.3 bar.

We measured adsorbate $H_2$ and $N_2$ at 77K (fluid nitrogen) and $CO_2$ at 25° C.

APPLICABILITY IN INDUSTRY

MOFs with the above properties can be used for applications oriented particularly on storing of gases, separation of gases, as drug carriers, for preparation of membranes, of heterogeneous catalysts, sorbents, lithium batteries, of proton conductors and they can be used in analytical chemistry as sensors, above all, of gases, ions or biologically active substances.

The invention claimed is:

1. A porous material for storing of molecules distinguished by the fact that it has porosity of 220 $m^2$/g to 1200 $m^2$/g and that consists of a coordination polymer net formed of coordination polymer of bis to tetra phosphinic acid and of trivalent metal cation in ratio 3:1 of bound phosphinic groups to metal cation with polymer chemical structure with monomer unit of general formula:

I.

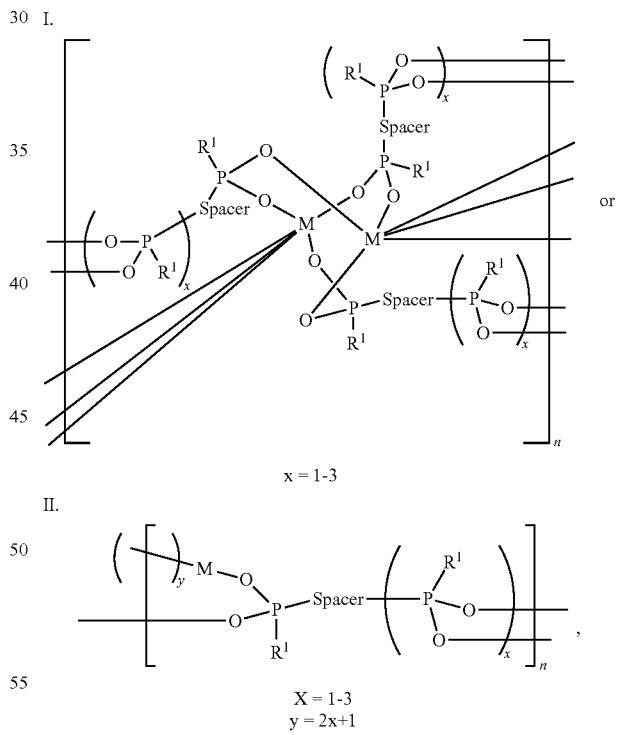

$x = 1-3$

II.

$X = 1-3$
$y = 2x+1$ where $R^1$ is hydrogen, alkyl or aryl and possibly alkyl or aryl carrying a functional group or it substitutes the second bond of phosphorus to spacer, M is a trivalent metal cation and spacer is aryl frame of bis- or trisphosphinic acid or aryl frame of residuum of tetrakisphosphinic acid with two free phosphine groups.

2. The porous material for storing of molecules according to claim 1 distinguished by the fact that the metal is iron, chrome, aluminium or yttrium.

3. The porous material for storing of molecules according to claim 1 distinguished by the fact that the aryl frame of residuum of bis-phosphinic acid has this structure:

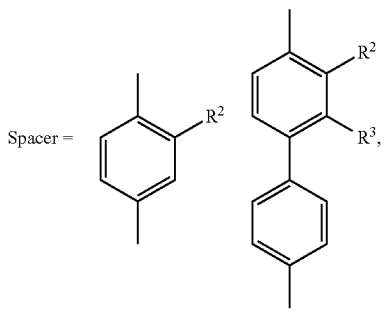

where $R^2$ and $R^3$ is hydrogen, alkyl, aryl or functional group and possibly alkyl or aryl carrying a functional group.

4. The porous material for storing of molecules according to claim 1 distinguished by the fact that the bis-phosphine acid has this structure:

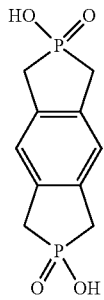 [SMILES: O=P1(O)Cc2cc3c(cc2C1)CP(=O)(O)C3]

5. The porous material for storing of molecules according to claim 1 distinguished by the fact that the tris-phosphine acid has this structure:

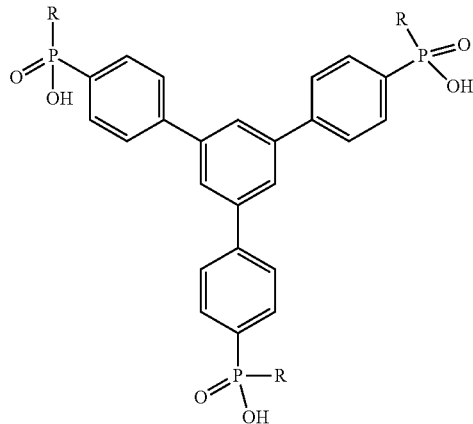

6. The porous material for storing of molecules according to claim 1 distinguished by the fact that the tetrakis-phosphine acid has this structure:

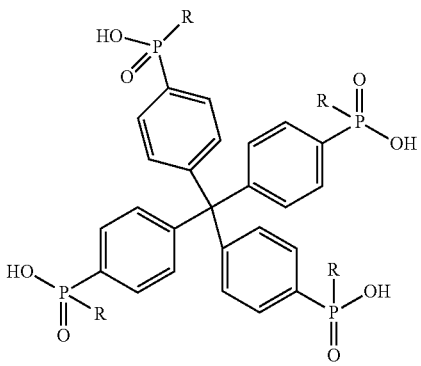

7. A method of preparation of the porous material for storing of molecules according to claim 1 distinguished by the fact that the chloride, nitrate or sulphate of metal cation is mixed with bis, tri or tetra-phosphine acid, in molar ratio of metal to phosphine groups 1:2 to 1:8, solvent is added and the mixture is kept at temperature 25° C. to 250° C. for, at least, 24 hours without stirring, and after cooling the resulting mixture is separated.

8. The method of preparation of porous material for storing of molecules according to claim 5, distinguished by the fact that the range of molar ratio of metal to phosphine group of bis, tri or tetra phosphinic acid is 1:4.

9. The method of preparation of porous material for storing of molecules according to claim 5, distinguished by the fact that the chloride of metal cation is chloride of aluminium or of chromium or of yttrium or of iron or its hydride.

10. The method of preparation of porous material for storing of molecules according to claim 5, distinguished by the fact that the solvent is water, N,N-dialkyl formamide, formamide, acetone, hexane, acetonitrile, toluene, dimethylsulphoxide, N-methyl-2-pyrrolidone, tetrahydrofuran, monohydric alcohol, organic acid or mixtures of these solvents.

11. The method of preparation of porous material for storing of molecules according to claim 5, distinguished by the fact that the solvent is ethanol.

\* \* \* \* \*